(12) United States Patent
Kashiwagi et al.

(10) Patent No.: US 12,165,282 B2
(45) Date of Patent: Dec. 10, 2024

(54) IMAGE PROCESSING DEVICE, RANGING DEVICE, AND METHOD

(71) Applicant: KABUSHIKI KAISHA TOSHIBA, Tokyo (JP)

(72) Inventors: Masako Kashiwagi, Ageo Saitama (JP); Nao Mishima, Tokyo (JP); Akihito Seki, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 739 days.

(21) Appl. No.: 17/468,539

(22) Filed: Sep. 7, 2021

(65) Prior Publication Data

US 2022/0270222 A1  Aug. 25, 2022

(30) Foreign Application Priority Data

Feb. 25, 2021 (JP) .................. 2021-028830

(51) Int. Cl.
*G06T 5/20* (2006.01)
*G06T 5/50* (2006.01)
*G06T 7/55* (2017.01)

(52) U.S. Cl.
CPC .................. *G06T 5/20* (2013.01); *G06T 5/50* (2013.01); *G06T 7/55* (2017.01); *G06T 2207/10024* (2013.01); *G06T 2207/20081* (2013.01)

(58) Field of Classification Search
CPC .... G06T 5/20; G06T 5/50; G06T 7/55; G06T 2207/10024; G06T 2207/20081;
(Continued)

(56) References Cited

U.S. PATENT DOCUMENTS 8,988,789 B2   3/2015  Tang et al.
2020/0051264 A1   2/2020  Mishima et al.
(Continued)

FOREIGN PATENT DOCUMENTS

JP   2017-92983 A   5/2017
JP   2020-26990 A   2/2020
(Continued)

OTHER PUBLICATIONS

Daniel J. Reiley, "Photographic primes," https://www.lens-designs.com/photographic-primes, 18 pages (Jun. 19, 2021).
(Continued)

*Primary Examiner* — Mekonen T Bekele
(74) *Attorney, Agent, or Firm* — Finnegan, Henderson, Farabow, Garrett & Dunner, LLP

(57) ABSTRACT

According to one embodiment, an image processing device includes storage and a processor. The storage is configured to store a statistical model generated by learning bokeh that occurs in a first image affected by aberration of an optical system and varies non-linearly in accordance with a distance to a subject in the first image. The processor is configured to acquire a second image affected by the aberration of the optical system, perform color correction on the second image to reduce a number of colors expressed in the second image, and input a third image, obtained by performing the color correction on the second image, into the statistical model and acquire first distance information indicating a distance to a subject in the third image.

16 Claims, 26 Drawing Sheets

(58) Field of Classification Search
CPC ... G06T 5/60; G06T 5/73; G06T 2207/10012; G06T 2207/20084; H04N 23/55; H04N 23/54; H04N 23/67; H04N 23/80
See application file for complete search history.

(56) References Cited

U.S. PATENT DOCUMENTS

2020/0294260 A1* 9/2020 Kashiwagi .............. G06T 7/571
2021/0082146 A1   3/2021 Kashiwagi et al.

FOREIGN PATENT DOCUMENTS

| JP | 2020-148483 A | 9/2020 |
| JP | 2021-43115 A | 3/2021 |

OTHER PUBLICATIONS

Japan Color Enterprise, "XYZ (Yxy) Color System," http://www.sikiken.co.jp/colors/colors10.html, 1 page (2007).

Masako Kashiwagi et al., "Monocular Depth Measurement and Inference Speedup by Lens Aberration of Smartphone Camera," 27th Symp. on Sensing via Image Information, 8 pages (2021).

National Renewable Energy Laboratory, "2000 ASTM Standard Extraterrestrial Spectrum Reference E-490-00," https://www.nrel.gov/grid/solar-resource/spectra-astm-e490.html, 31 pages (2000).

T. Nomoto, "Lighting and Display," http://spectra.nomoto.org/2004/08/09, 2 pages (2004).

* cited by examiner

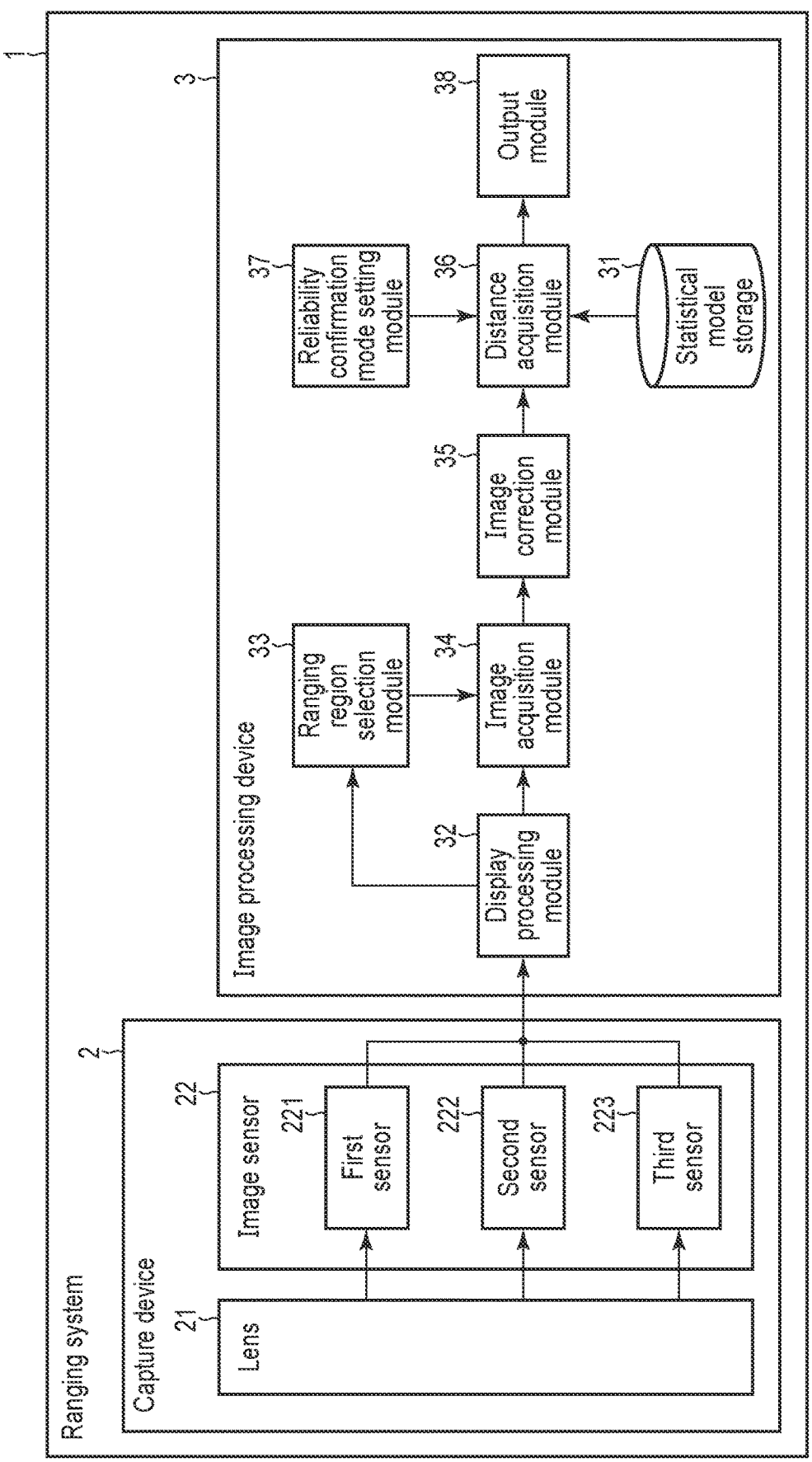
F I G. 1

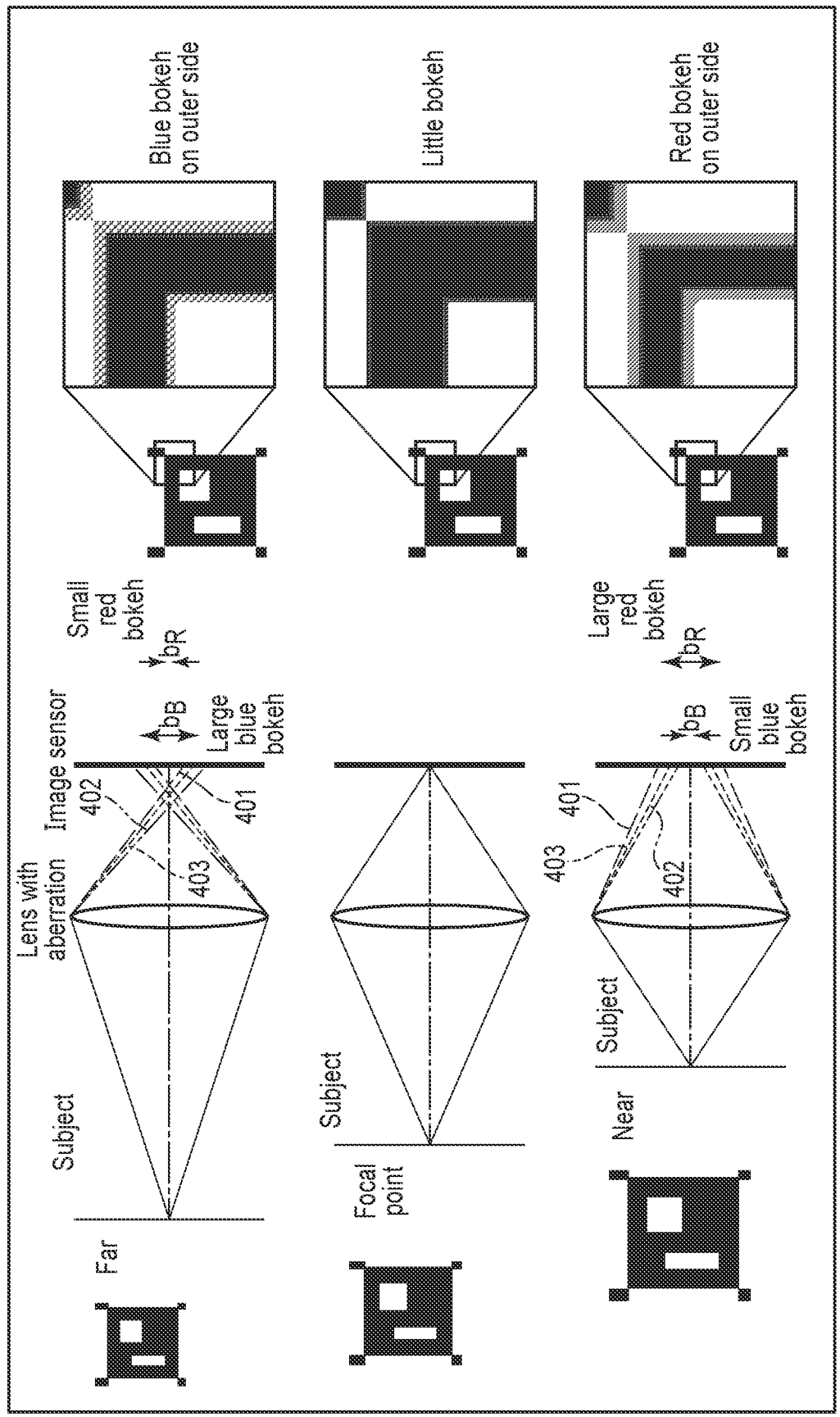
F I G. 4

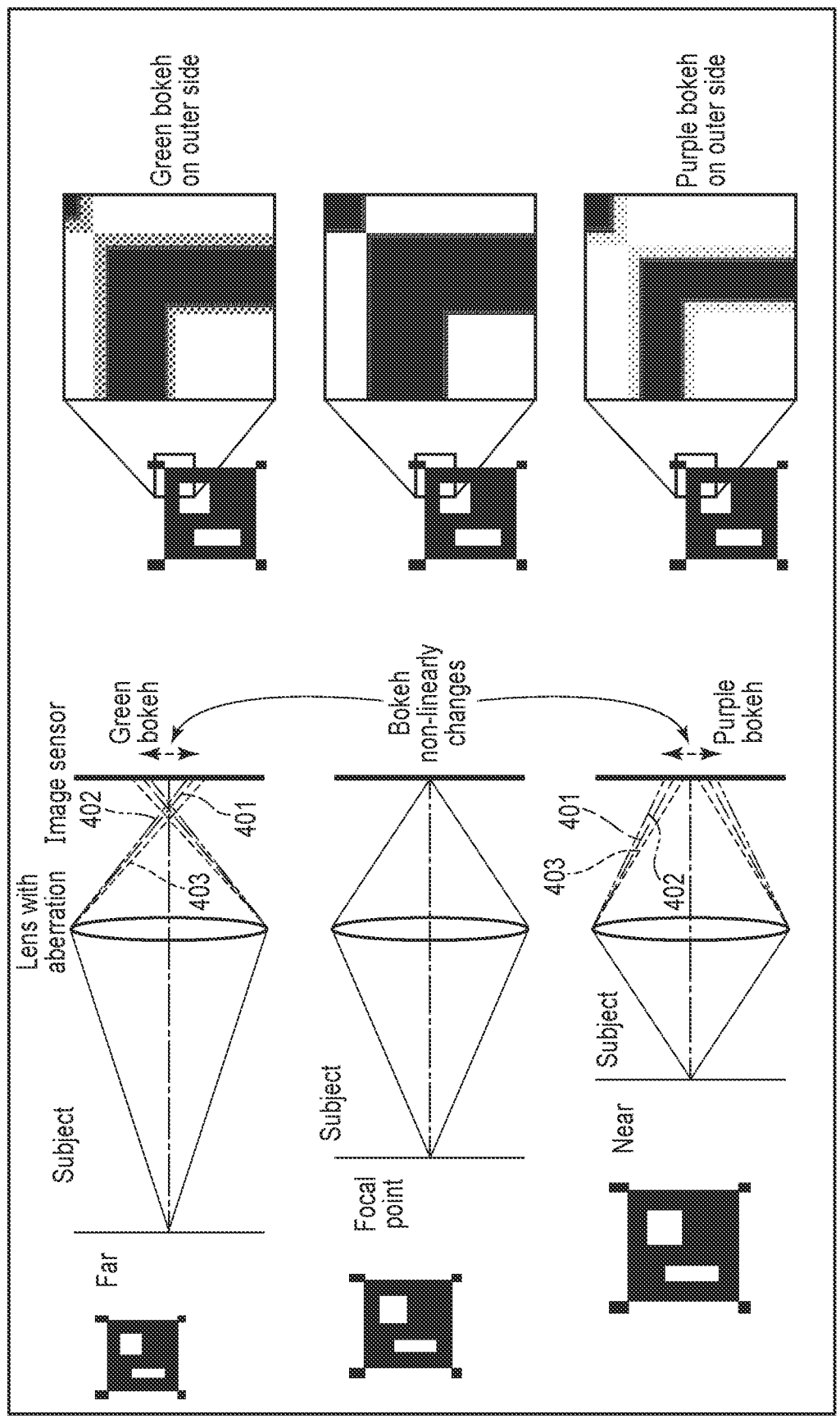
F I G. 5

| Shape | Near | Far |
|---|---|---|
| Circle | ○ | ○ |
| Line-symmetric arrangement of even-gon | ⬢ | ⬢ |
| Odd-gon | ⬠ | ⬠ |
| Asymmetric arrangement of even-gon | ⬢ | ⬢ |

PSF has no asymmetry: Circle, Line-symmetric arrangement of even-gon

PSF has asymmetry: Odd-gon, Asymmetric arrangement of even-gon

F I G. 11

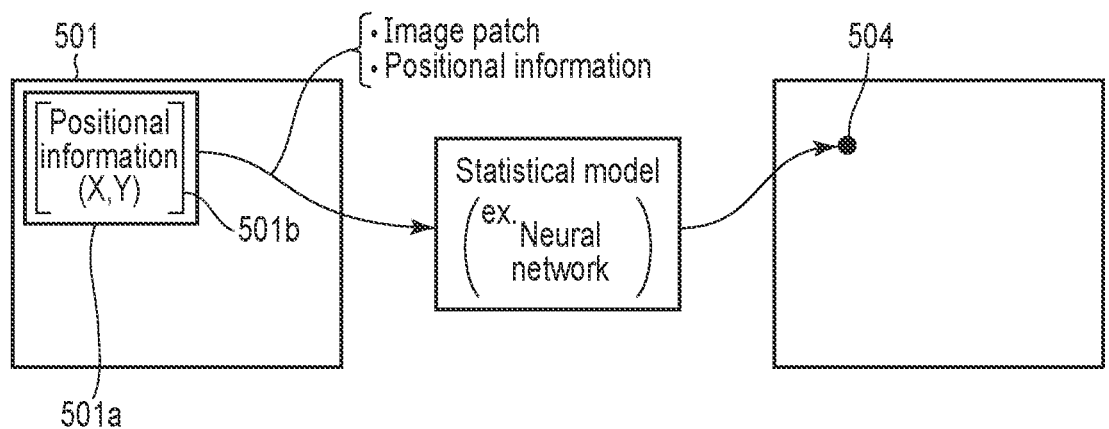
F I G. 15
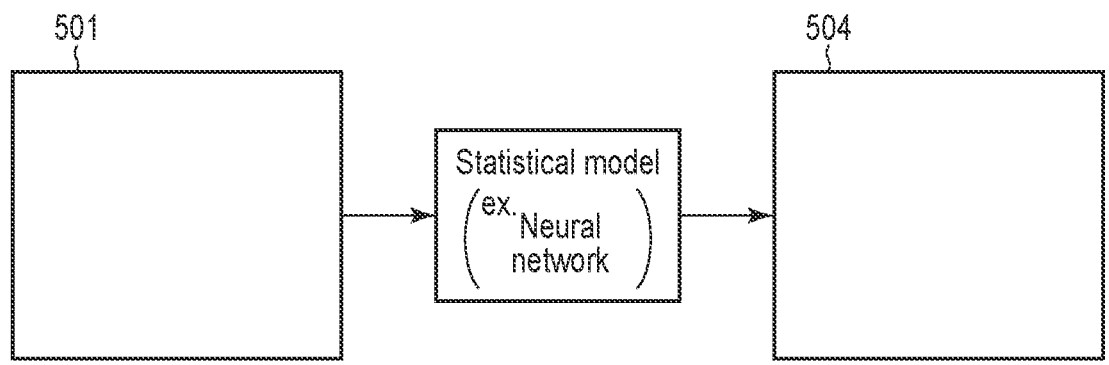
F I G. 17

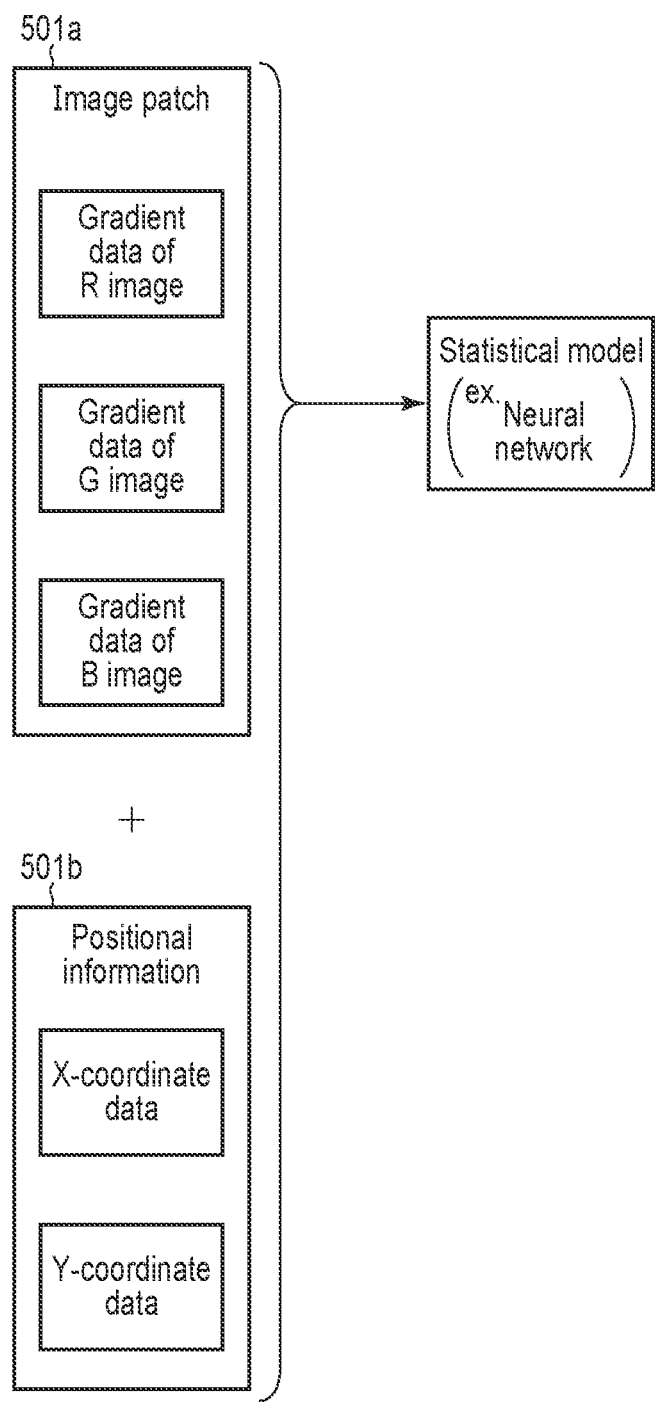
F I G. 16

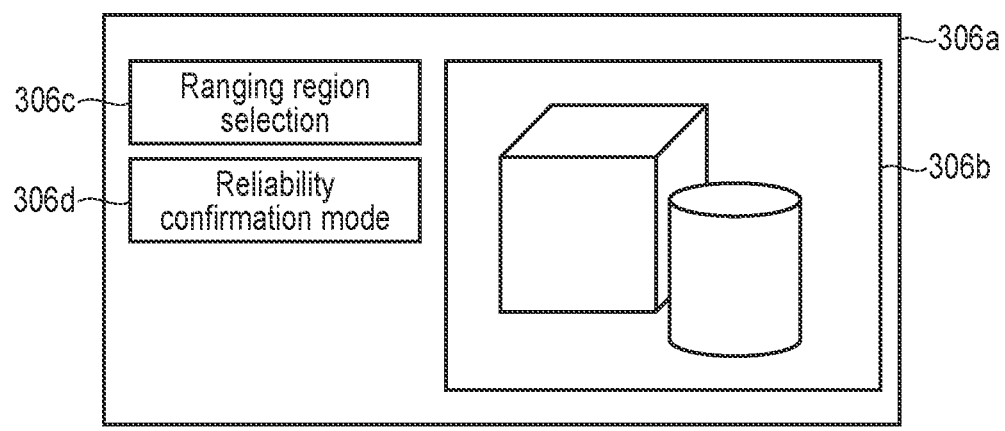
F I G. 20
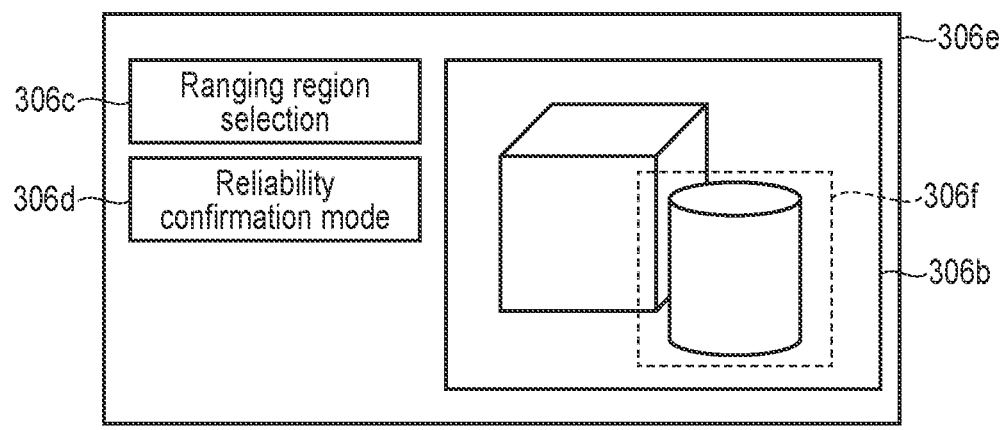
F I G. 21

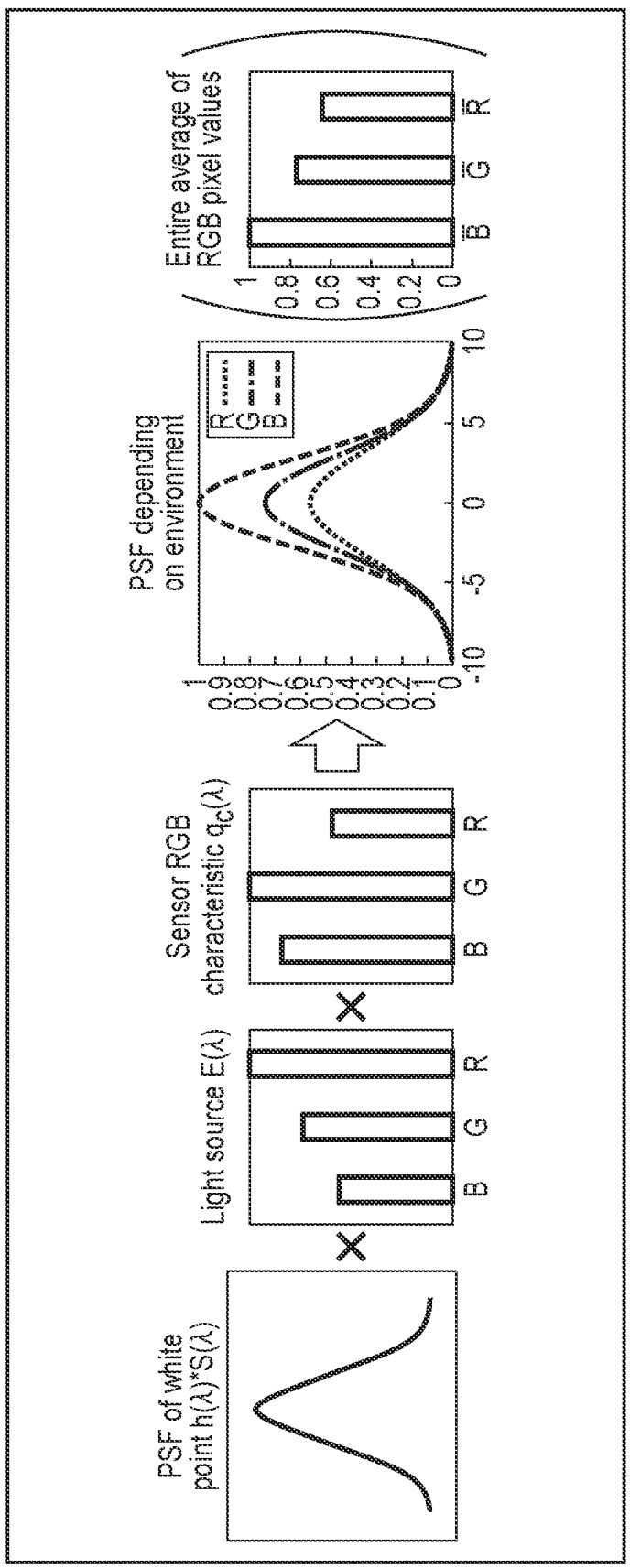
F I G. 22

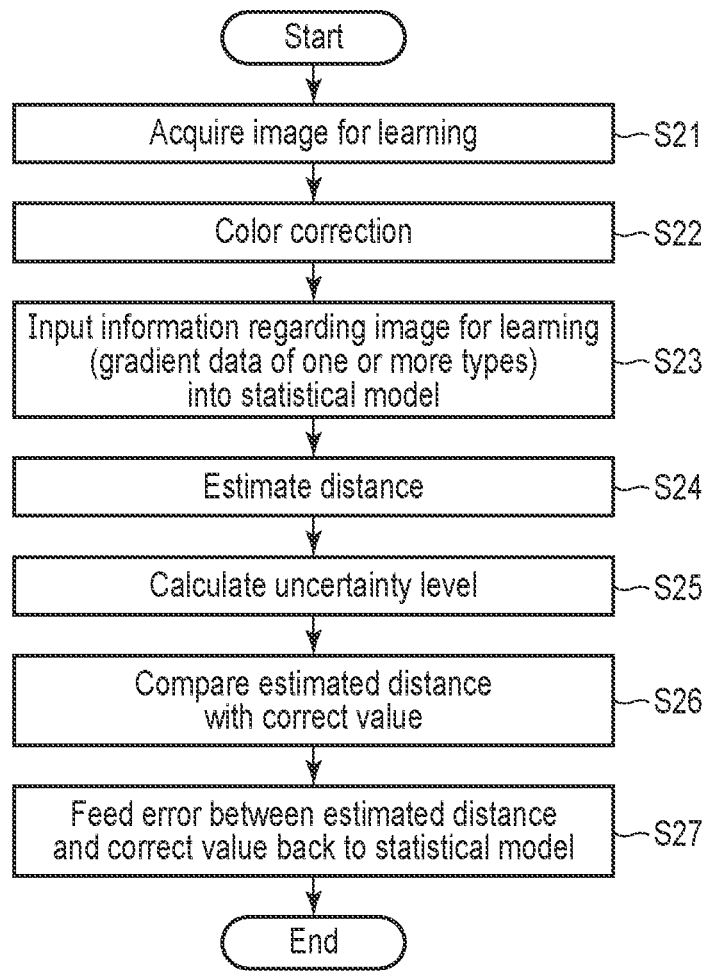
F I G. 28

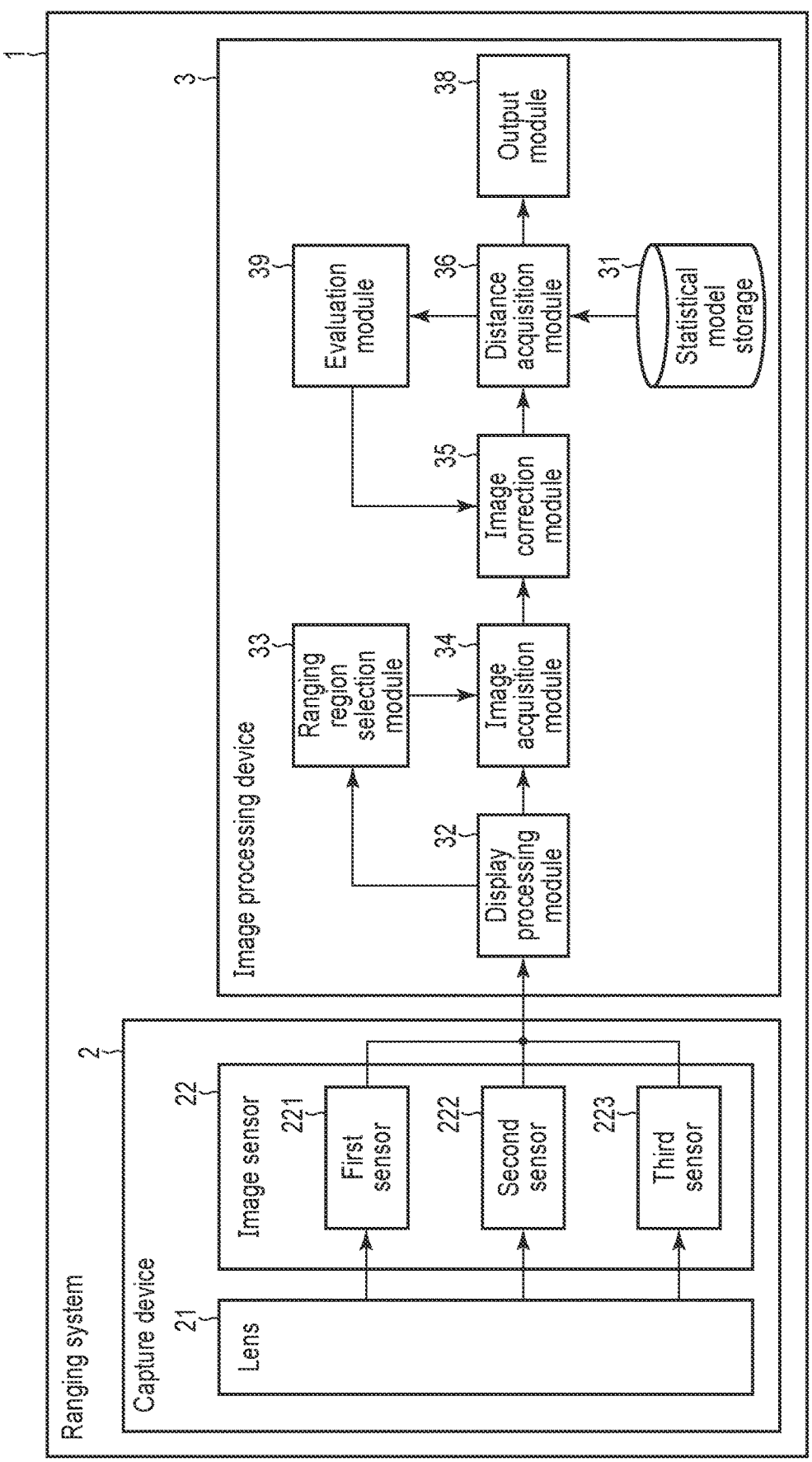
F I G. 29

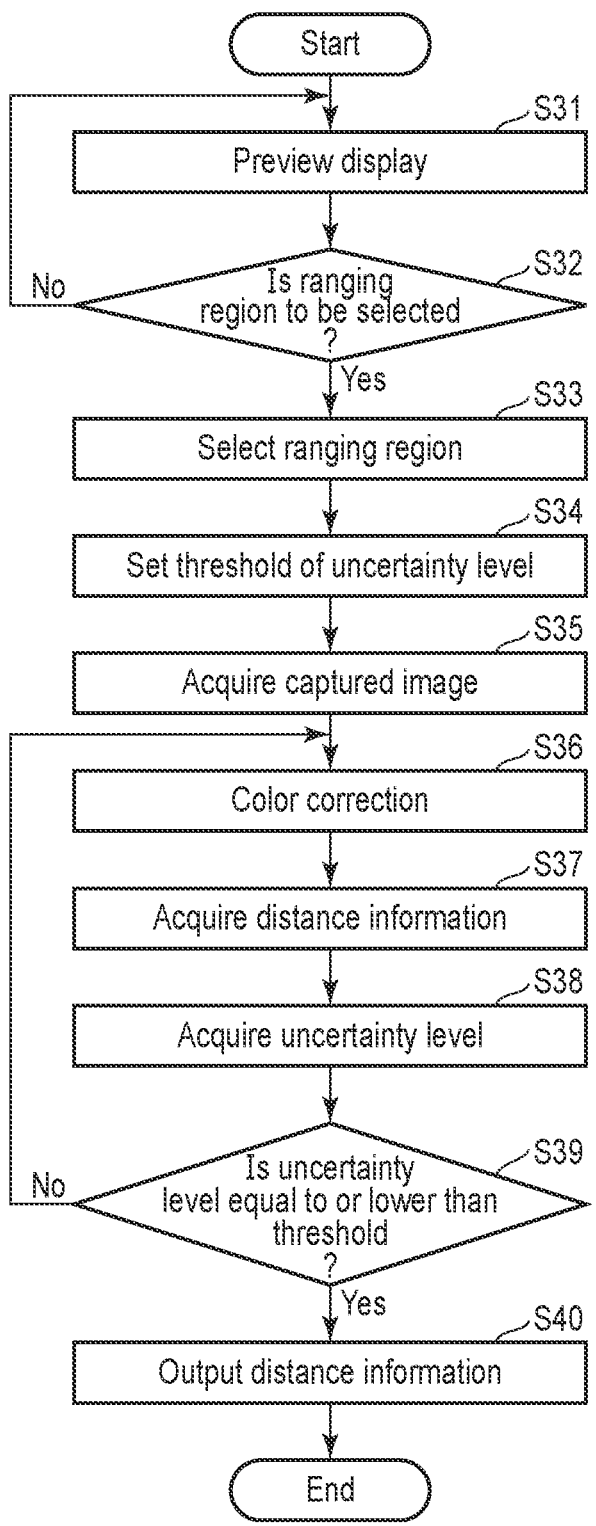
F I G. 30

IMAGE PROCESSING DEVICE, RANGING DEVICE, AND METHOD

CROSS-REFERENCE TO RELATED APPLICATIONS

This application is based upon and claims the benefit of priority from Japanese Patent Application No. 2021-028830, filed Feb. 25, 2021, the entire contents of which are incorporated herein by reference.

FIELD

Embodiments described herein relate generally to an image processing device, a ranging device, and a method.

BACKGROUND

In general, a technique for using images captured by two capture devices (cameras) or a stereo camera (compound-eye camera) in order to acquire a distance to a subject. In recent years, however, a technology for acquiring a distance to a subject using an image captured by one capture device (monocular camera) has been developed.

However, it is necessary to improve the accuracy of the distance acquired from the image captured by the one capture device and environmental robustness when the distance is acquired from the image.

BRIEF DESCRIPTION OF THE DRAWINGS

FIG. 1 is a diagram illustrating an exemplary configuration of a ranging system including an image processing device according to a first embodiment.

FIG. 4 is a diagram illustrating the relationship between a distance to a subject and bokeh that occurs in an image due to chromatic aberration in a case where a single lens is used.

FIG. 5 is a diagram illustrating the relationship between a distance to a subject and bokeh that occurs in an image due to chromatic aberration in a case where an achromatic lens is used.

FIG. 11 is a diagram illustrating the relationship between the nonlinearity of the PSF shape and the shape of the aperture of the diaphragm mechanism.

FIG. 15 is a diagram for describing a second method of estimating a distance from a captured image.

FIG. 16 is a diagram illustrating exemplary information to be input into a statistical model in the second method.

FIG. 17 is a diagram for describing a third method of estimating a distance from a captured image.

FIG. 20 is a diagram illustrating an exemplary preview screen.

FIG. 21 is a diagram illustrating an exemplary preview screen when a ranging region selection button is pressed.

FIG. 22 is a diagram for describing PSF depending on an environment.

FIG. 28 is a flowchart of an exemplary processing procedure of a process of generating the statistical model.

FIG. 29 is a diagram illustrating an exemplary configuration of a ranging system including an image processing device according to a second embodiment.

FIG. 30 is a diagram for describing an exemplary processing procedure of an image processing device when distance information is acquired from a captured image.

DETAILED DESCRIPTION

Figure 2:
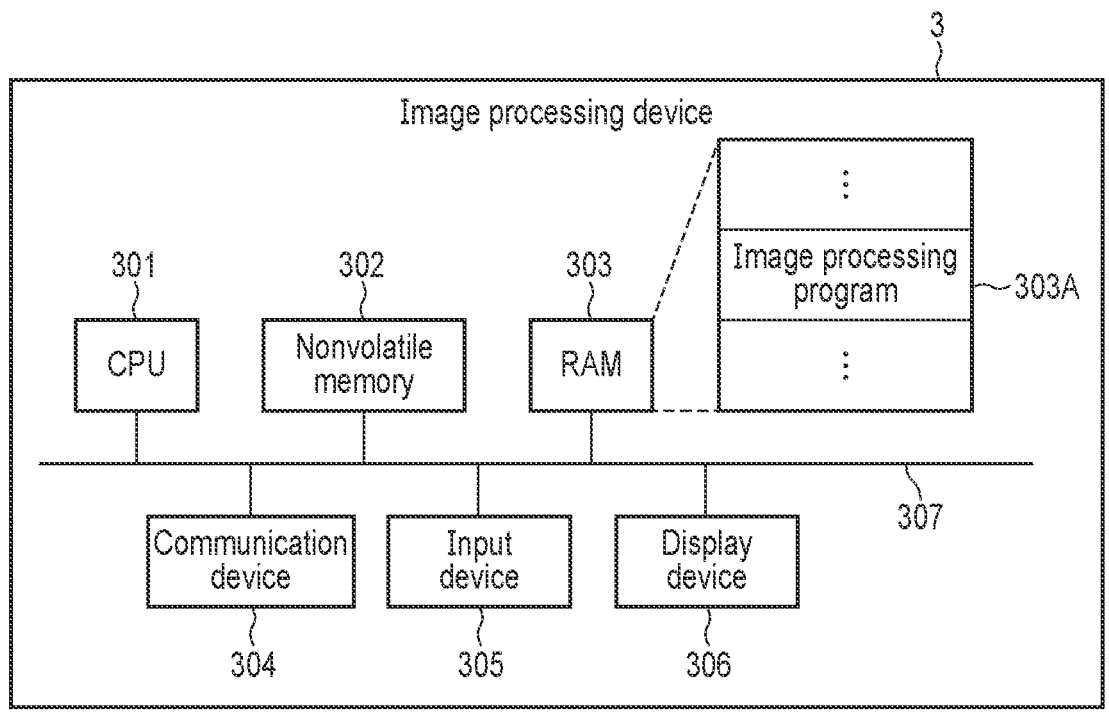
FIG. 2 is a diagram illustrating an exemplary system configuration of the image processing device.

In general, according to one embodiment, an image processing device includes storage and a processor. The storage is configured to store a statistical model generated by learning bokeh that occurs in a first image affected by aberration of an optical system and varies non-linearly in accordance with a distance to a subject in the first image. The processor is configured to acquire a second image affected by the aberration of the optical system, perform color correction on the second image to reduce a number of colors expressed in the second image, and input a third image, obtained by performing the color correction on the second image, into the statistical model and acquire first distance information indicating a distance to a subject in the third image.

Each embodiment will be described with reference to the drawings hereinafter.

First Embodiment

First, a first embodiment will be described. FIG. 1 illustrates an exemplary configuration of a ranging system including an image processing device according to the present embodiment. A ranging system 1 illustrated in FIG. 1 is used to capture an image and acquire (measure) a distance from a capturing point to a subject using the captured image.

As illustrated in FIG. 1, the ranging system 1 includes a capture device 2 and an image processing device 3. In the present embodiment, a description will be given assuming that the ranging system 1 includes the capture device 2 and the image processing device 3 which are separate devices. However, the ranging system 1 may be implemented as one device (hereinafter, referred to as a ranging device) in which the capture device 2 functions as an image capturing unit and the image processing device 3 functions as an image processing unit. In the case of the ranging system 1, for example, a digital camera or the like can be used as the capture device 2, and a personal computer, a smartphone, a tablet computer, or the like can be used as the image processing device 3. In this case, the image processing device 3 may operate as, for example, a server device that executes a cloud computing service. Meanwhile, in the case of the ranging device 1, a digital camera, a smartphone, a tablet computer, and the like can be used as the ranging device 1.

The capture device 2 is used to capture various images. The capture device 2 includes a lens 21 and an image sensor 22. The lens 21 and the image sensor 22 correspond to an optical system of the capture device 2 (monocular camera). In the present embodiment, the lens 21 form a lens unit together with a mechanism, a lens drive circuit, and the like for adjusting a position of the lens 21 to control a focal point, a diaphragm mechanism, a diaphragm control circuit, and the like having an aperture for adjusting the quantity of light (incident light quantity) taken into the optical system of the capture device 2, and a control circuit or the like on which a memory or the like (not illustrated) holding information regarding the lens 21 (hereinafter, referred to as lens information) in advance is mounted.

In the present embodiment, the capture device 2 may be configured such that the lens 21 (lens unit) can be manually replaced with another lens. In this case, a user can attach one of a plurality of types of lenses, such as a standard lens, a telephoto lens, and a wide-angle lens, to the capture device 2 for use. Note that replacement with a lens causes a focal length and an f-number (aperture value) to vary so that an image can be captured in accordance with the lens used in the capture device 2.

In the present embodiment, the focal length means the distance from the lens to the position at which parallel light that has entered the lens converges. The f-number results from numerical conversion of the quantity of light to be taken in the capture device 2 in accordance with the diaphragm mechanism. Note that, as the f-number decreases in value, the quantity of light to be taken in the capture device 2 increases (namely, the aperture increases in size).

Light reflected on the subject enters the lens 21. The light having entered the lens 21 passes through the lens 21. The light having passed through the lens 21 reaches the image sensor 22, so that the image sensor 22 receives (detects) the light. The image sensor 22 converts (photoelectrically converts) the received light into an electric signal to generate an image of a plurality of pixels.

Note that, for example, the image sensor 22 is achieved by a charge coupled device (CCD) image sensor or a complementary metal oxide semiconductor (CMOS) image sensor. For example, the image sensor 22 includes a first sensor (R sensor) 221 that detects light in a red (R) wavelength band, a second sensor (G sensor) 222 that detects light in a green (G) wavelength band, and a sensor (B sensor) 223 that detects light in a blue (B) wavelength band. The image sensor 22 can receive light in the wavelength bands corresponding to the first to third sensors 221 to 223, and generate sensor images (R image, G image, and B image) corresponding to the respective wavelength bands (color components). That is, the image captured by the capture device 2 is a color image (RGB image), and the image includes the R image, the G image, and the B image.

Note that the image sensor 22 including the first to third sensors 221 to 223 will be described in the present embodiment. However, the image sensor 22 needs to include at least one of the first to third sensors 221 to 223. Further, the image sensor 22 may include a sensor for generation of a monochrome image, instead of including the first to third sensors 221 to 223.

In the present embodiment, the image generated based on the light having passed through the lens 21 is the image that has been affected by the aberration of (lens 21 included in) the optical system, and thus, includes bokeh due to the aberration. Note that the bokeh that occurs in the image will be described in detail below.

The image processing device 3 includes, as functional configurations, statistical model storage 31, a display processing module 32, a ranging region selection module 33, an image acquisition module 34, an image correction module 35, a distance acquisition module 36, a reliability confirmation mode setting module 37, and an output module 38.

The statistical model storage 31 stores a statistical model used to acquire the distance to the subject from the image captured by the capture device 2. This statistical model stored in the statistical model storage 31 is generated by learning the bokeh that occurs in the image affected by the aberration of the optical system and varies non-linearly in accordance with the distance to the subject in the image. The statistical model storage 31 may store a plurality of statistical models.

Note that such a statistical model can be generated by application of various known machine learning algorithms, such as a neural network and a random forest. Examples of the neural network applicable in the present embodiment may include a convolutional neural network (CNN), a fully connected neural network, and a recurrent neural network.

The display processing module 32 sequentially displays a plurality of images continuously captured by the above-described capture device 2 as preview display.

The ranging region selection module 33 selects a region in the image (namely, the image captured by the capture device 2) displayed by the display processing module 32. Note that the distance (information) to the subject included in the region selected by the ranging region selection module 33 is acquired in the present embodiment. Further, the region selected by the ranging region selection module 33 is determined based on, for example, an operation of the user or the like.

That is, the above-described preview display means that an image is displayed in advance for the user to confirm the subject or the like that is a target for acquisition of the distance in the present embodiment.

When the region in the image displayed by the display processing module 32 is selected by the ranging region selection module 33, the image acquisition module 34 acquires the image.

The image correction module 35 performs color correction on the image acquired by the image acquisition module 34. In this case, the image correction module 35 performs correction to reduce the number of colors expressed in the image (in which a color variation can be reduced) on the image acquired by the image acquisition module 34.

The distance acquisition module 36 acquires distance information indicating the distance to the subject in the image (the region selected by the ranging region selection module 33) subjected to the color correction by the image correction module 35. In this case, the distance acquisition module 36 acquires the distance information by inputting the image after having been subjected to the color correction by the image correction module 35 to the statistical model stored in the statistical model storage 31 as will be described later.

The reliability confirmation mode setting module 37 sets a reliability confirmation mode based on an operation of the user. The reliability confirmation mode is a mode for the user to confirm the reliability (level of uncertainty) with respect to the distance to the subject. When the reliability confirmation mode is set by the reliability confirmation mode setting module 37, the user can confirm the reliability of the distance indicated by the distance information acquired by the distance acquisition module 36, for example, on the preview screen described above.

The output module 38 acquires the distance information acquired by the distance acquisition module 36. Note that the distance information may be displayed via the display processing module 32, for example, or may be output to the outside of the image processing device 3.

FIG. 2 illustrates an example of a system configuration of the image processing device 3 illustrated in FIG. 1. As illustrated in FIG. 2, the image processing device 3 includes a CPU 301, a nonvolatile memory 302, a RAM 303, a communication device 304, an input device 305, a display device 306, and the like. The image processing device 3 further includes a bus 307 that connects the CPU 301, the nonvolatile memory 302, the RAM 303, the communication device 304, the input device 305, and the display device 306 to each other.

The CPU 301 is a processor configured to control operations of various components in the image processing device 3. The CPU 301 may be a single processor or may be formed of a plurality of processors. The CPU 301 executes various programs loaded from the nonvolatile memory 302 to the RAM 303. Examples of the programs include an operating system (OS) and various application programs. The application program includes an image processing program 303A for acquiring a distance from the capture device 2 to a subject in an image using the image captured by the capture device 2.

The nonvolatile memory 302 is a storage medium for use as an auxiliary storage. The RAM 303 is a storage medium for use as a main storage. Although only the nonvolatile memory 302 and the RAM 303 are illustrated in FIG. 2, the image processing device 3 may include a different storage, such as a hard disk drive (HDD) and a solid state drive (SSD).

In the present embodiment, the statistical model storage 31 illustrated in FIG. 1 is implemented by, for example, the nonvolatile memory 302 or another storage device.

In the present embodiment, some or all of the display processing module 32, the ranging region selection module 33, the image acquisition module 34, the image correction module 35, the distance acquisition module 36, the reliability confirmation mode setting module 37, and the output module 38 illustrated in FIG. 1 are implemented by causing the CPU 301 (namely, the computer of the image processing device 3) to execute the image processing program 303A, that is, by software. The image processing program 303A may be distributed in the state of being stored in a computer-readable storage medium, or may be downloaded to the image processing device 3 through a network. Note that some or all of these modules 32 to 38 may be implemented by hardware such as an integrated circuit (IC), or may be implemented by a combination of software and hardware.

The communication device 304 is a device configured to perform wired communication or wireless communication. The communication device 304 executes communication or the like with an external device via a network. The external device includes the capture device 2. In this case, the image processing device 3 receives an image from the capture device 2 via the communication device 304.

Examples of the input device 305 include a mouse, a keyboard, and the like. Examples of the display device 306 include a liquid crystal display (LCD) and the like. Note that the input device 305 and the display device 306 may be integrally configured as, for example, a touch screen display.

Figure 3:
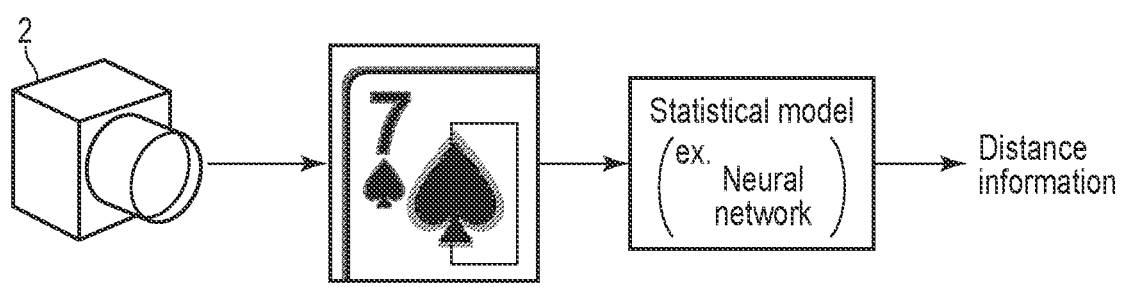
FIG. 3 is a diagram for describing an outline of an operation of the ranging system.

Next, an outline of an operation of the ranging system 1 in the present embodiment will be described with reference to FIG. 3.

In the ranging system 1, the capture device 2 (image sensor 22) generates the image affected by the aberration of the optical system (lens 21) as described above.

The image processing device 3 acquires the image generated by the capture device 2, and inputs the image to the statistical model stored in the statistical model storage 31. Although not illustrated in FIG. 3, the image input into the statistical model in the present embodiment is an image after having been subjected to color correction. Details of the color correction performed on the image will be described later.

The image processing device 3 (distance acquisition module 36) acquires distance information indicating a distance to a subject in the image output from the statistical model to which the image has been input.

In this manner, the distance information can be acquired from the image captured by the capture device 2 using the statistical model in the present embodiment.

Here, in the present embodiment, the image captured by the capture device 2 includes bokeh due to the aberration of the optical system (lens aberration) of the capture device 2 as described above.

The bokeh that occurs in the image captured by the capture device 2, will be described below. First, chromatic aberration, related to the bokeh due to the aberration of the optical system of the capture device 2, will be described.

FIG. 4 illustrates the relationship between the distance to the subject and the bokeh that occurs in the image due to the chromatic aberration. In the following description, the in-focus position in the capture device 2 is referred to as the focal point.

The refractive index of the lens 21 having aberration varies every wavelength band of light to pass therethrough. Thus, for example, in a case where the position of the subject is shifted from the focal point, the respective rays of light in the wavelength bands do not converge to one point and thus reach different points. As a result, the chromatic aberration (bokeh) appears on the image.

FIG. 4 illustrates, on the upper side thereof, a case where the position of the subject is far from the capture device 2 (image sensor 22) with respect to the focal point (namely, the position of the subject is on the far side of the focal point).

In this case, regarding light 401 in the red wavelength band, the image sensor 22 (first sensor 221) generates an image including a relatively small bokeh $b_R$. Meanwhile, regarding light 402 in the blue wavelength band, the image sensor 22 (third sensor 223) generates an image including a relatively large bokeh $b_B$. Note that, regarding the light 403 in the green wavelength band, an image including bokeh intermediate in size between the bokeh $b_R$ and the bokeh $b_B$ is generated. Therefore, in the image captured with the position of the subject far with respect to the focal point, blue bokeh is observed outside the subject in the image.

Meanwhile, FIG. 4 illustrates, on the lower side thereof, a case where the position of the subject is near to the capture device 2 (image sensor 22) with respect to the focal point (namely, the position of the subject is on the near side of the focal point).

In this case, regarding the light 401 in the red wavelength band, the image sensor 22 (first sensor 221) generates an image including a relatively large bokeh $b_R$. Meanwhile, regarding the light 402 in the blue wavelength band, the image sensor 22 (third sensor 223) generates an image including a relatively small bokeh $b_B$. Note that, regarding the light 403 in the green wavelength band, an image including bokeh intermediate in size between the bokeh $b_R$ and the bokeh $b_B$ is generated. Therefore, in the image captured with the position of the subject near with respect to the focal point, a red bokeh is observed outside the subject in the image.

Here, FIG. 4 illustrates the example in which the lens 21 that is the simple single lens. However, for example, a lens subjected to chromatic aberration correction (hereinafter, referred to as an achromatic lens) is used in the capture device 2 in general. Note that the achromatic lens is a combination of a low-dispersion convex lens and a high-dispersion concave lens and is smallest in the number of lenses among lenses for correction of chromatic aberration.

FIG. 5 illustrates the relationship between the distance to the subject and the bokeh that occurs in the image due to the chromatic aberration in a case where the achromatic lens is used as the lens 21. Although the achromatic lens is designed to have the focal point constant between blue wavelength and red wavelength, the chromatic aberration cannot be eliminated completely. Thus, in a case where the position of the subject is far with respect to the focal point, green bokeh occurs as illustrated on the upper side of FIG. 5. In a case where the position of the subject is near with respect to the focal point, purple bokeh occurs as illustrated on the lower side of FIG. 5.

Note that FIGS. 4 and 5 each illustrate, on the middle side thereof, a case where the position of the subject to the capture device 2 (image sensor 22) coincides with the focal point. In each case, the image sensor 22 (first to third sensors 221 to 223) generates an image having bokeh less in amount.

Here, because the diaphragm mechanism is provided in the optical system (lens unit) of the capture device 2 as described above, the shape of the bokeh that occurs in the image captured by the capture device 2 varies due to the size of the aperture of the diaphragm mechanism. Note that the shape of the bokeh is referred to as a point spread function (PSF) shape, and indicates the diffusion distribution of light that occurs at the time of capturing of a point light source.

Figure 6:
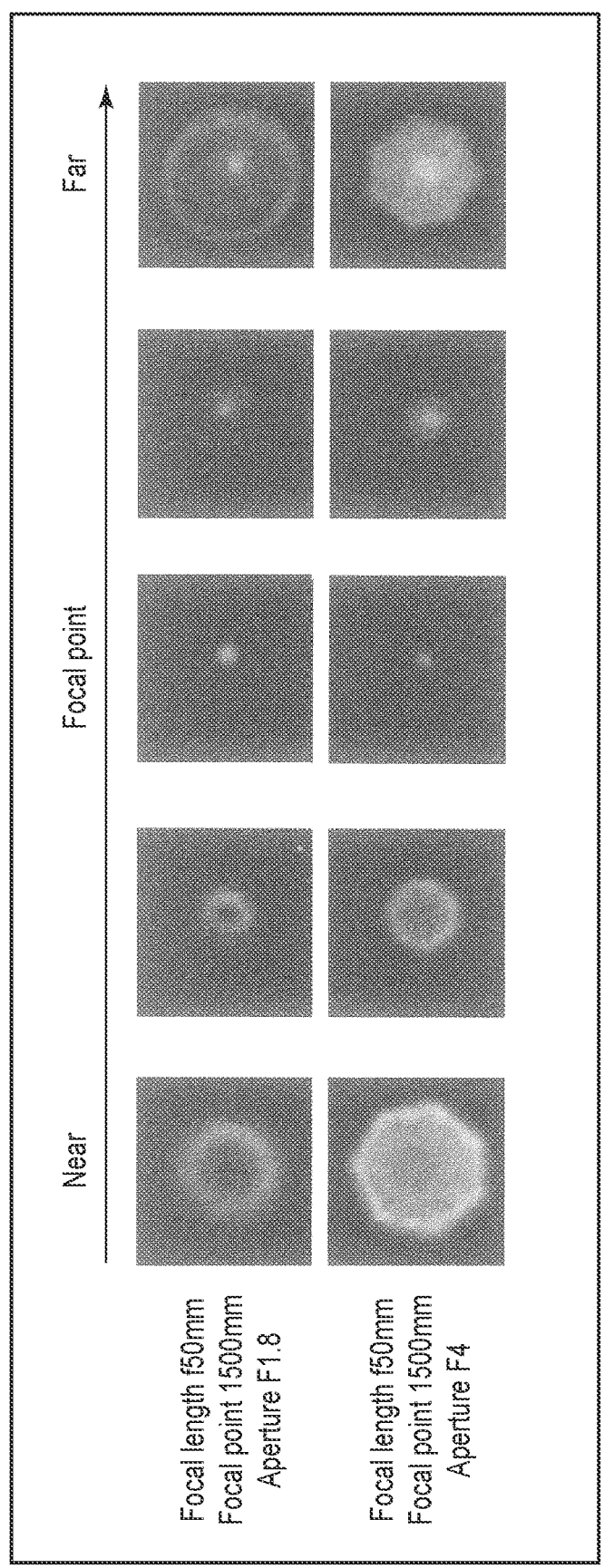
FIG. 6 is a diagram illustrating the relationship between a size of an aperture of a diaphragm mechanism included in an optical system of the capture device and a PSF shape.

FIG. 6 illustrates, from left on the upper side thereof, the PSF shape that occurs in the central portion of the image captured by the capture device 2 including a lens having a focal length of 50 mm with the focal point and the f-number (aperture) that are 1500 mm and F1.8, respectively, in (the optical system of) the capture device 2, in order of the position of the subject closer to the capture device 2. FIG. 6 illustrates, from left on the lower side thereof, the PSF shape that occurs in the central portion of the image captured by the capture device 2 including a lens having a focal length of 50 mm with the focal point and the f-number (aperture) that are 1500 mm and F4, respectively, in (the optical system of) the capture device 2, in order of the position of the subject closer to the capture device 2. Note that FIG. 6 illustrates, at the center on each of the upper side and the lower side thereof, the PSF shape in a case where the position of the subject coincides with the focal point.

The respective PSF shapes illustrated at the corresponding positions on the upper side and the lower side of FIG. 6 are identical in the position of subject to the capture device 2. However, even in a case where identification is satisfied in the position of subject, the PSF shape on the upper side (PSF shape that occurs in the image captured with the f-number being F1.8) and the PSF shape on the lower side (PSF shape that occurs in the image captured with the f-number being F4) are different in shape.

Further, as indicated in the PSF shape on the leftmost side of FIG. 6 and the PSF shape on the rightmost side of FIG. 6, the PSF shapes in a case where the position of the subject is closer than the focal point are different from those in a case where the position of the subject is farther than the focal point even when, for example, the distance from the subject position to the focal point is approximately the same.

Figure 7:
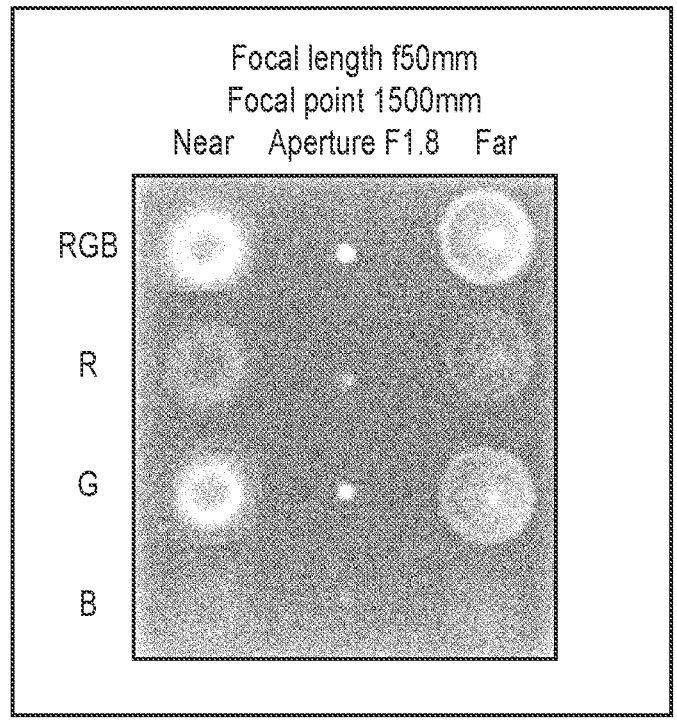
FIG. 7 is a diagram illustrating an exemplary PSF shape that occurs in an image on each channel.
Figure 8:
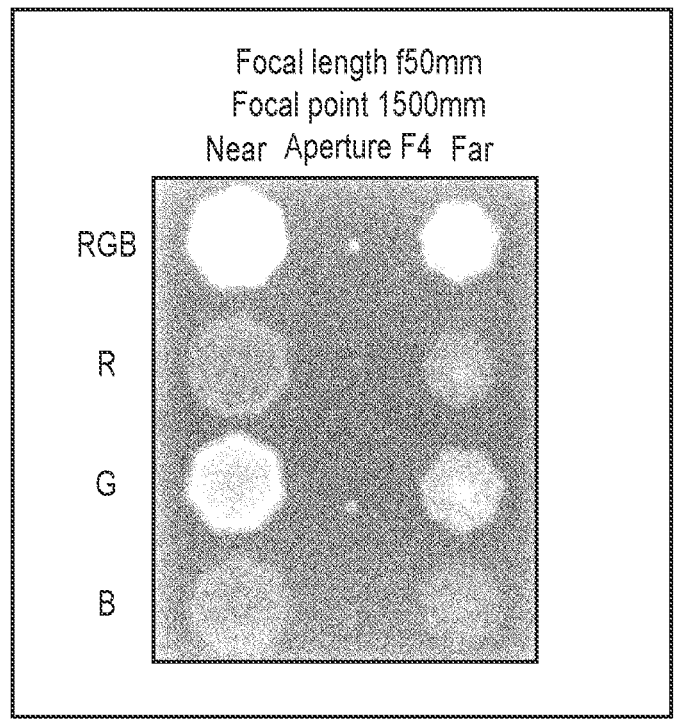
FIG. 8 is a diagram illustrating another exemplary PSF shape that occurs in an image on each channel.

Note that the phenomenon in which the PSF shape varies in accordance with the size of the aperture of the diaphragm mechanism or the position of the subject to the capture device 2 as described above, occurs in each channel (RGB image, R image, G image, and B image), similarly. FIG. 7 separately illustrates a case where the position of the subject is near with respect to the focal point (near side) and a case where the position of the subject is far with respect to the focal point (far side), for the PSF shape that occurs in the image in each channel captured by the capture device 2. In FIG. 7, the capture device 2 includes a lens having a focal length of 50 mm with the focal point and the f-number that are 1500 mm and F1.8. FIG. 8 separately illustrates a case where the position of the subject is near with respect to the focal point and a case where the position of the subject is far with respect to the focal point, for the PSF shape that occurs in the image in each channel captured by the capture device 2. In FIG. 8, the capture device 2 includes a lens having a focal length of 50 mm with the focal point and the f-number that are 1500 mm and F4.

Further, the PSF shape that occurs in the image captured by the capture device 2 varies depending on position in the image.

Figure 9:
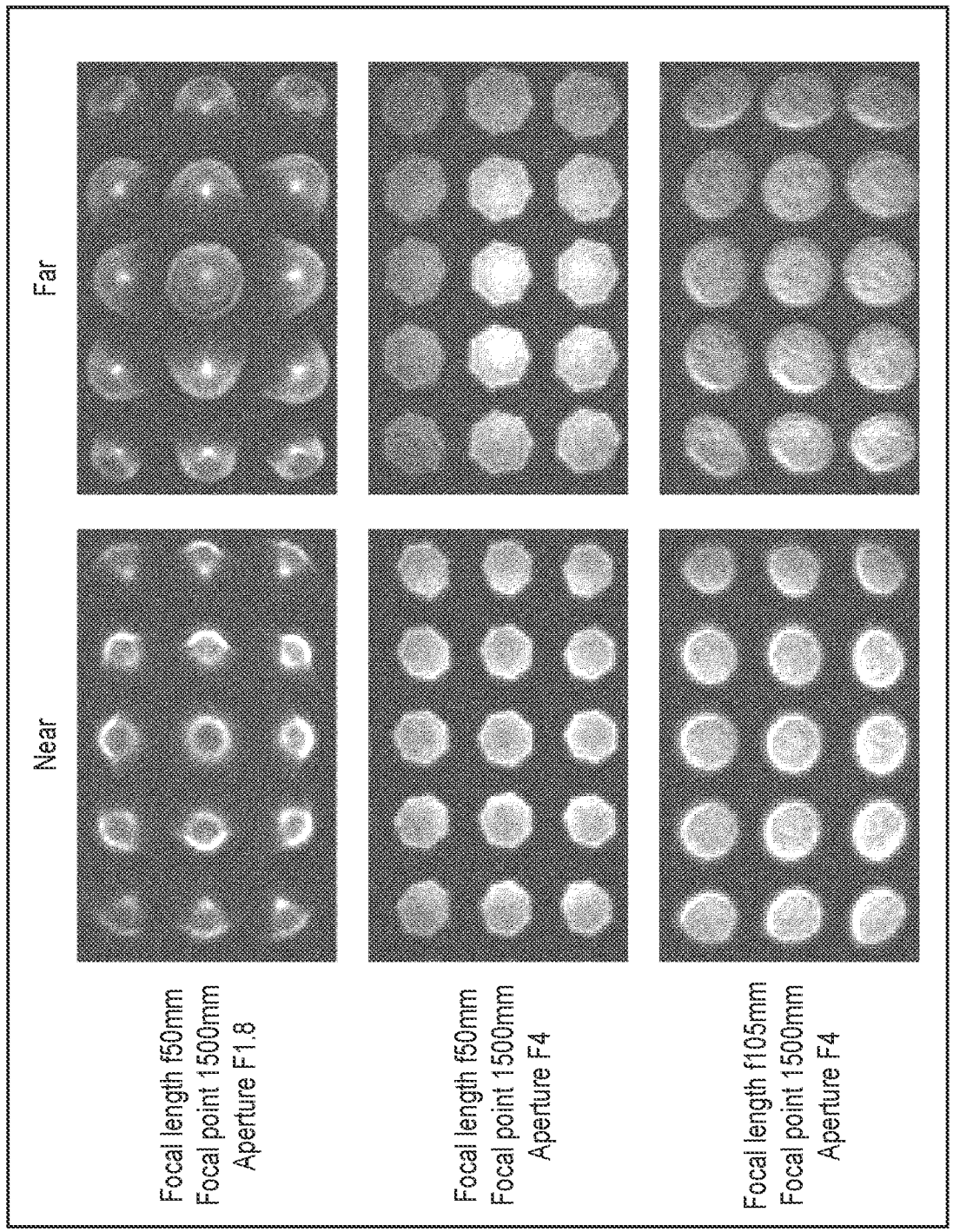
FIG. 9 is a diagram illustrating an exemplary PSF shape that occurs at each position in an image.

FIG. 9 separately illustrates, on the upper side thereof, a case where the position of the subject is near with respect to the focal point and a case where the position of the subject is far with respect to the focal point, for the PSF shape that occurs at each position in the image captured by the capture device 2. In the upper side of FIG. 9, the capture device 2 includes a lens having a focal length of 50 mm with the focal point and the f-number that are 1500 mm and F1.8.

FIG. 9 separately illustrates, on the middle side thereof, a case where the position of the subject is near with respect to the focal point and a case where the position of the subject is far with respect to the focal point, for the PSF shape that occurs at each position in the image captured by the capture device 2. In the middle side of FIG. 9, the capture device 2 includes a lens having a focal length of 50 mm with the focal point and the f-number that are 1500 mm and F4.

As illustrated on the upper side and the middle side of FIG. 9, for example, in the vicinity of an end portion of the image captured by the capture device 2 (in particular, the vicinity of the upper-left corner portion), a PSF shape different from the PSF shape located in the vicinity of the center of the image can be observed.

FIG. 9 separately illustrates, on the lower side thereof, a case where the position of the subject is near with respect to the focal point and a case where the position of the subject is far with respect to the focal point, for the PSF shape that occurs at each position in the image captured by the capture device 2. In the lower side of FIG. 9, the capture device 2 includes a lens having a focal length of 105 mm with the focal point and the f-number that are 1500 mm and F4.

FIG. 9 illustrates, on the upper side and the middle side thereof, the PSF shape that occurs in the image captured with the same lens. As illustrated on the lower side of FIG. 9, in the case of use of the lens different in focal length, the PSF shape varied in accordance with the lens is observed (PSF shape different from those on the upper side and the middle side of FIG. 9).

Figure 10:
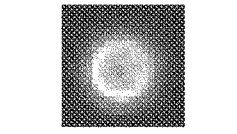
FIG. 10 is a diagram specifically describing the positional dependence of the PSF shape according to each type of lens.

Next, the positional dependence of the PSF shape corresponding to each type of lens (aberration of each lens) for use in the optical system of the capture device 2, will be specifically described with reference to FIG. 10. FIG. 10 illustrates the PSF shapes that occurs in the vicinity of the center of the image (screen center) and in the vicinity of the end portion of the image (screen end) captured with each of a plurality of lenses different in focal length. The PSF shapes are separately illustrated in a case where the position of the subject is near with respect to the focal point and in a case where the position of the subject is far with respect to the focal point.

As illustrated in FIG. 10, the PSF shape that occurs in the vicinity of the center of the image is approximately circular and constant even in a case where types of lenses are different from each other. However, the PSF shape that occurs in the vicinity of the end portion of the image is different in shape from the PSF shape that occurs in the vicinity of the center of the image and varies in characteristic (feature) in accordance with each type of lens. Note that the point that the purple bokeh occurs in the vicinity of the edge of the PSF in a case where the position of the subject is near with respect to the focal point and the green bokeh occurs in the vicinity of the edge of the PSF in a case where the position of the subject is far with respect to the focal point, described in FIG. 5, is satisfied even in a case where types of lenses are different from each other.

FIG. 10 illustrates two examples regarding a lens having a focal length of 50 mm (#1 and #2). The examples are identical in a focal length of 50 mm but are different in lens manufacturer (namely, different in product). The same applies to a lens having a focal length of 85 mm.

In the image processing device 3 (ranging system 1) according to the present embodiment, the distance to the subject is acquired from the image using the statistical model generated by focusing on the bokeh (color, size, and shape) that varies non-linearly in accordance with the distance to the subject (namely, the position of the subject with respect to the capture device 2) in the image as described above.

Note that examples of the bokeh that varies non-linearly in accordance with the distance to the subject in the present embodiment include the bokeh that occurs due to the chromatic aberration of the optical system of the capture device 2 described in FIGS. 4 and 5, the bokeh that occurs in accordance with the size of the aperture (namely, the f-number) of the diaphragm mechanism that adjusts the quantity of light to be taken in the optical system of the capture device 2 described in FIGS. 6 to 8, and the bokeh that varies in accordance with position in the image captured by the capture device 2 described in FIGS. 9 and 10.

Note that the PSF shape varies depending on the shape of the aperture of the diaphragm mechanism. Here, FIG. 11 illustrates the relationship between the nonlinearity (asymmetry) of the PSF shape and the shape of the aperture of the diaphragm mechanism. The nonlinearity of the PSF shape occurs easily in a case where the shape of the aperture of the diaphragm mechanism is not circular. In particular, the nonlinearity of the PSF shape occurs easily in a case where the shape of the aperture is odd-gonal or in a case where an even-gon is arranged asymmetrically to the horizontal or vertical axis of the image sensor 22.

Further, in FIG. 9 described above, each image indicates the PSF shape depending on the distance to the subject in the image and position in the image (namely, the bokeh having the distance dependence and the positional dependence). Each image is referred to as an aberration map. The aberration map is information in a map format indicating the distribution of the bokeh that occurs in the image affected by the aberration of the optical system and depends on the distance to the subject in the image and position in the image. In other words, the aberration map is information indicating the distance dependence and the positional dependence of the bokeh in the image due to the aberration (namely, the aberration of the optical system). Such an aberration map may be used when the distance to the subject in the image is estimated (namely, distance information indicating the distance is acquired).

Figure 12:
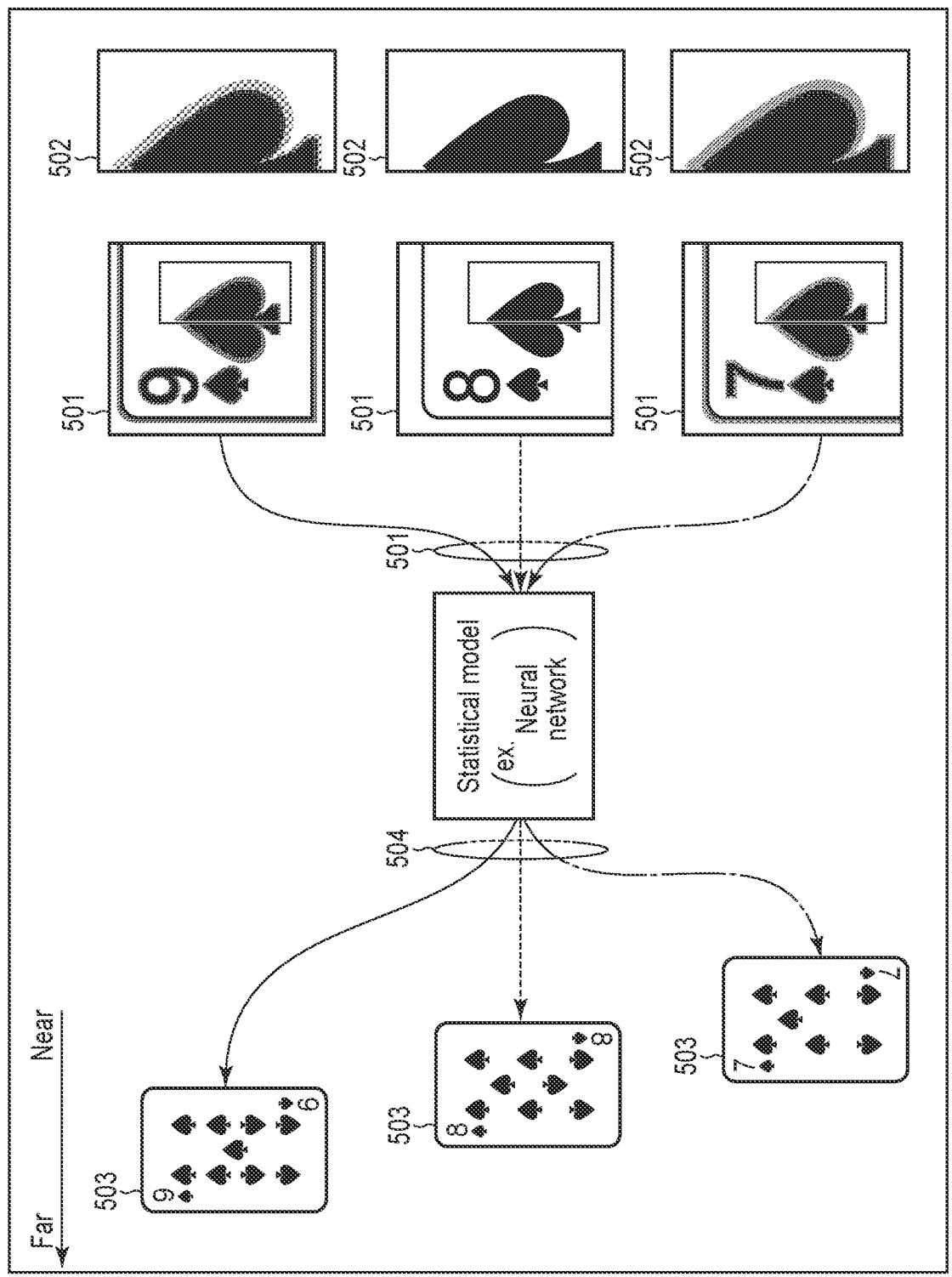
FIG. 12 is a diagram illustrating an outline of an operation of acquiring distance information.

FIG. 12 illustrates an outline of an operation of acquiring the distance information in the present embodiment. In the following description, an image captured by the capture device 2 to acquire the distance information (distance to the subject) is referred to as a captured image.

Bokeh (bokeh information) 502 that occurs in a captured image 501 illustrated in FIG. 12 is a physical clue regarding the distance to a subject 503. Specifically, the color of the bokeh and the size and shape of the PSF are clues regarding the distance to the subject 503.

The image processing device 3 (distance acquisition module 36) according to the present embodiment estimates a distance 504 to the subject 503 by analyzing (interpreting) the bokeh 502 that occurs in the captured image 501, which is a physical clue, with the statistical model.

An exemplary method of estimating the distance from the captured image by the statistical model in the present embodiment will be described hereinafter. Herein, first, second, and third methods will be described.

Figure 13:
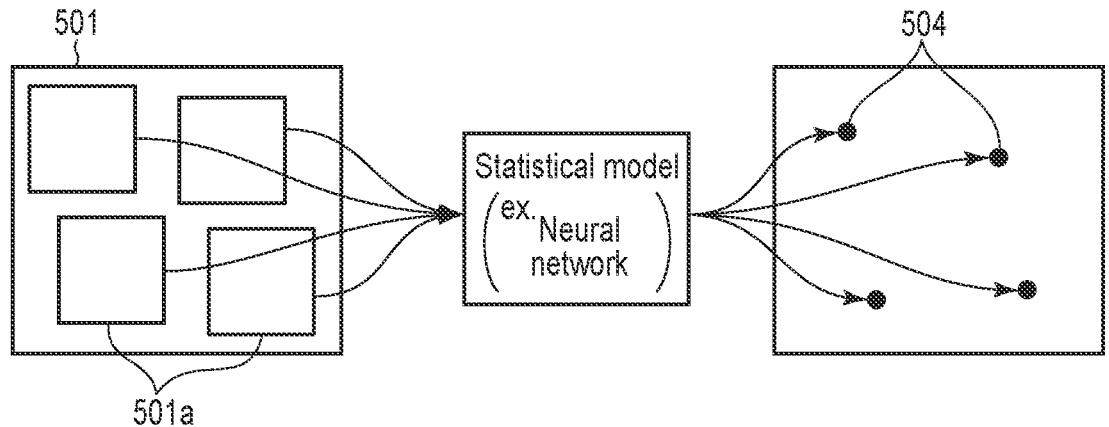
FIG. 13 is a diagram for describing a first method of estimating a distance from a captured image.

First, the first method will be described with reference to FIG. 13. In the first method, the distance acquisition module 36 extracts a local region (image patch) 501a from the captured image 501.

In this case, for example, the entire region (or a predetermined region) of the captured image 501 may be divided in a matrix and then each divided partial region may be sequentially extracted as the local region 501a. The local region 501a may be extracted by recognition of the captured image 501 such that the region in which the subject (image) is detected is covered. The local region 501a may partially overlap another local region 501a.

Every extracted local region 501a, the distance acquisition module 36 inputs information regarding the local region 501a (information regarding the captured image 501) into the statistical model, to estimate the distance 504 to the subject in the local region 501a.

The statistical model in which the information regarding the local region 501a is input as above, estimates the distance every pixel of the local region 501a.

Here, for example, in a case where a specific pixel belongs to both of a first local region 501a and a second local region 501a (namely, the pixel is included in the region in which the first local region 501a and the second local region 501a overlap), the distance estimated with the pixel belonging to the first local region 501a and the distance estimated with the pixel belonging to the second local region 501a do not necessarily coincide with each other.

Thus, for example, as described above, in a case where a plurality of local regions 501a partially overlapping has been extracted, the distance based on a pixel in the region in which the plurality of local regions 501a overlaps, may be the average value of, for example, the distance estimated based on the overlapped partial region (pixel) of one local region 501a and the distance estimated based on the overlapped partial region (pixel) of the other local region 501a. In a case where three or more local regions 501a partially overlapping are extracted, the distance of the pixel forming a region where the three or more local regions 501a overlap may be determined by majority decision with the respective distances estimated based on the overlapped partial regions of the three or more local regions 501a.

Figure 14:
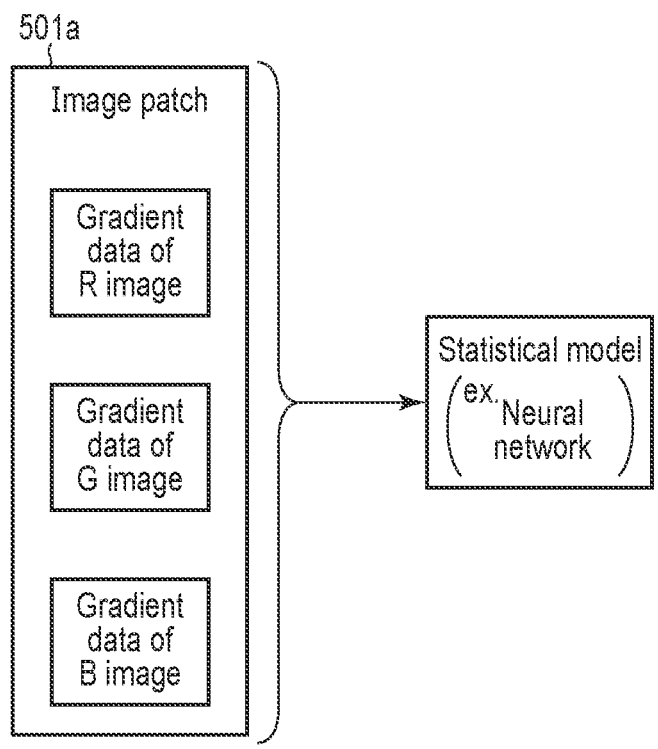
FIG. 14 is a diagram illustrating exemplary information to be input into a statistical model in the first method.

FIG. 14 illustrates exemplary information regarding the local region 501a to be input into the statistical model in the first method.

For each of the R image, the G image, and the B image included in the captured image 501, the distance acquisition module 36 generates gradient data of the local region 501a extracted from the captured image 501 (gradient data of the R image, gradient data of the G image, and gradient data of the B image). The gradient data generated by the distance acquisition module 36 as above is input into the statistical model.

Note that the gradient data indicates the difference in pixel value (difference value) between each pixel and a pixel adjacent thereto. For example, in a case where the local region 501a is extracted as a rectangular region of n pixels (X-axis direction)×m pixels (Y-axis direction), the gradient data is generated in which the difference value calculated between each pixel in the local region 501a and, for example, the right adjacent pixel thereto is arranged in a matrix of n rows×m columns.

With the gradient data of the R image, the gradient data of the G image, and the gradient data of the B image, the statistical model estimates the distance from the bokeh occurring in each image. FIG. 14 illustrates a case where the gradient data of each of the R image, the G image, and the B image is input into the statistical model. However, the gradient data of the captured image 501 (RGB image) may be input into the statistical model.

Next, the second method will be described with reference to FIG. 15. In the second method, as the information regarding the local region 501a in the first method, the gradient data of each local region (image patch) 501a and positional information regarding the local region 501a in the captured image 501 are input into the statistical model.

For example, the positional information 501b may indicate the central point of the local region 501a or may indicate a predetermined side, such as an upper-left side. As the positional information 501b, positional information on the captured image 501 regarding each pixel of the local region (image patch) 501a may be used.

Additional input of the positional information 501b into the statistical model as described above, enables estimation of the distance 504 in consideration of the difference between the bokeh of a subject image formed by light passing through the central portion of the lens 21 and the bokeh of a subject image formed by light passing through the end portion of the lens 21.

That is, according to the second method, the distance can be more reliably estimated from the captured image 501, based on the correlation between the bokeh, the distance, and the position on the image.

FIG. 16 illustrates exemplary information regarding the local region 501a to be input into the statistical model in the second method.

For example, in a case where a rectangular region of n pixels (X-axis direction)×m pixels (Y-axis direction) is extracted as the local region 501a, the distance acquisition module 36 acquires an X-coordinate value (X-coordinate data) on the captured image 501 corresponding to, for example, the central point of the local region 501a and a Y-coordinate value (Y-coordinate data) on the captured image 501 corresponding to, for example, the central point of the local region 501a.

In the second method, the X-coordinate data and the Y-coordinate data acquired by the distance acquisition module 36 as above are input into the statistical model, together with the pieces of gradient data of the R image, the G image, and the B image.

Further, the third method will be described with reference to FIG. 17. In the third method, no local region (image patch) 501a is extracted from the captured image 501, unlike the first method and the second method. In the third method, the distance acquisition module 36 inputs, for example, information regarding the entire region (or predetermined region) of the captured image 501 (pieces of gradient data of the R image, the G image, and the B image) into the statistical model.

In comparison with the first method and the second method in which the distance 504 is estimated every local region 501a, the third method is likely to increase the uncertainty of estimation of the statistical model but enables reduction of the load of the distance acquisition module 36.

In the following description, for convenience, the information to be input into the statistical model in each of the first, second, and third methods is referred to as information regarding the image.

Here, the distance to the subject estimated from the captured image will be specifically described with reference to FIG. 18.

Figure 18:
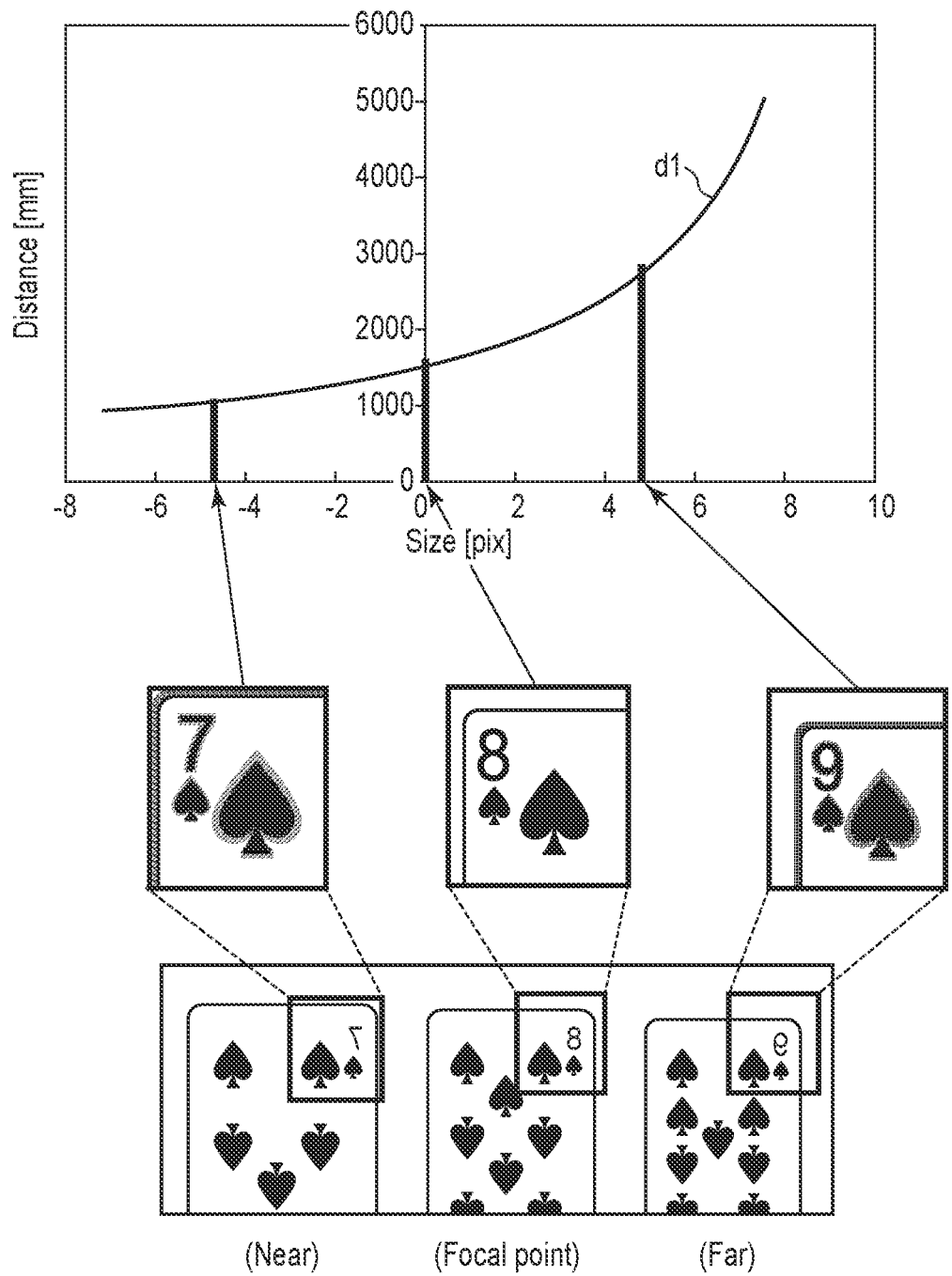
FIG. 18 is a diagram for specifically describing a distance to a subject which is estimated from the captured image.

In FIG. 18, the size of the bokeh that occurs in a case where the subject is near with respect to the focal point (near side) is indicated negatively in value on the X axis. Further, in FIG. 18, the size of the bokeh that occurs in a case where the subject is far with respect to the focal point (far side) is indicated positively in value on the X axis. That is, in FIG. 18, the color and size of the bokeh are indicated positively and negatively in value.

FIG. 18 illustrates that the absolute value of the size (pixel) of the bokeh increases as the subject moves away from the focal point in both of the case where the position of the subject is near with respect to the focal point and the case where the position of the subject is far with respect to the focal point.

The example illustrated in FIG. 18 assumes that the focal point is approximately 1500 mm in the optical system in which the image is captured. In this case, for example, the bokeh that is approximately −4.8 pixels in size corresponds to a distance of approximately 1000 mm from the optical system. The bokeh that is 0 pixels in size corresponds to a distance of 1500 mm from the optical system. The bokeh that is approximately 4.8 pixels in size corresponds to a distance of approximately 750 mm from the optical system.

Herein, for convenience, the case where the size (pixel) of the bokeh is indicated on the X axis has been described. As described in FIGS. 6 to 10, the shape of the bokeh (PSF shape) that occurs in the image varies between the case where the subject is near with respect to the focal point and the case where the subject is far with respect to the focal point, and varies depending on position in the image. Thus, the value indicated on the X axis in FIG. 18 has in practice taken the shape of the bokeh (PSF shape) into account.

The above-described distance to the subject is in correlation with the color, size, and shape of the bokeh as indicated with a line segment d1 of FIG. 18, for example, and thus, estimation of the distance and estimation of (positive or negative bokeh values indicating) the color, size, and shape of the bokeh are synonymous.

Note that, in comparison with direct estimation of the distance by the statistical model, estimation of the color, size, and shape of the bokeh by the statistical model enables improvement of the accuracy of estimation of the statistical model. In this case, every local region of n pixels (X-axis direction)×m pixels (Y-axis direction), for example, the information regarding the local region (image) is input into the statistical model, so that the statistical model outputs the distance in which the bokeh value indicating the color, size, and shape of the bokeh estimated based on each pixel of the local region is arranged in a matrix of n rows×m columns.

Next, an exemplary processing procedure of the image processing device 3 when distance information is acquired from a captured image will be described with reference to a flowchart of FIG. 19.

First, the capture device 2 (image sensor 22) continuously captures a subject to generate a plurality of captured images including the subject. Note that, in a case where a focal point of the capture device 2 is fixed, light transmitted through the lens 21 has a response shape of a point spread function (PSF) or a point image distribution function varying in accordance with the distance to the subject. The image sensor 22 detects such light, resulting in generation of a captured image affected by the aberration of the optical system of the capture device 2.

The display processing module 32 sequentially displays the plurality of captured images generated in the capture device 2 as described above on, for example, the display device 306 to perform preview display (Step S1).

Here, FIG. 20 illustrates an exemplary screen (hereinafter, referred to as preview screen) of the image processing device 3 (display device 306) when the preview display is performed in Step S1.

As illustrated in FIG. 20, the preview screen 306a is provided with an image display region 306b, a ranging region selection button 306c, and a reliability confirmation mode button 306d.

The image display region 306b is a region for sequentially displaying the plurality of captured images generated in the capture device 2 described above.

The ranging region selection button 306c is a button configured to instruct selection of a region which is in the captured image displayed in the image display region 306b and for which distance information is to be acquired (hereinafter, referred to as a ranging region).

The reliability confirmation mode button 306d is a button configured to instruct setting of a reliability confirmation mode.

In a case where the ranging region selection button 306c is pressed (designated) by the user in a state where the captured image is displayed in the image display region 306b, the preview screen 306a illustrated in FIG. 20 transitions to a preview screen 306e illustrated in FIG. 21, and the user can perform an operation of designating a ranging region on the image display region 306b provided on the preview screen 306e.

Specifically, for example, a rectangular frame 306f is displayed on the image display region 306b provided on the preview screen 306e, and the user can designate a region included in the frame 306f as the ranging region by performing an operation of changing a size of the frame 306f via the input device 305. As a result, the user can designate a region that is likely to include a subject for which distance information is to be acquired as the ranging region.

Returning to FIG. 19 again, the ranging region selection module 33 determines whether or not to select a ranging region in accordance with the operation of the user described above (Step S2). In Step S2, when the user presses the ranging region selection button provided on the preview screen, it is determined that the ranging region is to be selected.

When it is determined that the ranging region is not to be selected (NO in Step S2), the process is repeated by returning to Step S1.

On the other hand, when it is determined that the ranging region is to be selected (YES in Step S2), the ranging region selection module 33 selects the region designated by the operation of the user (for example, operation of changing the size of the frame 306f) as the ranging region. Note that, when the processing in Step S2 is executed, the ranging region selection module 33 acquires information (hereinafter, referred to as ranging region information) indicating the ranging region selected in Step S2. The ranging region information includes information (for example, a coordinate value or the like) that can specify the ranging region indicated by the ranging region information on the captured image.

Although the description has been given assuming that the region designated by the user is selected as the ranging region here, for example, in a case where the user performs an operation of designating a position on the image display region 306b (captured image), semantic segmentation that classifies each of pixels around a pixel corresponding to the designated position into categories based on pixel values or the like of the pixels may be performed. In this case, a region including a specific subject corresponding to the position designated by the user can be automatically detected, and the detected region can be selected as the ranging region. That is, the region including the subject detected based on the position in the captured image designated by the operation of the user may be selected as the ranging region in the present embodiment.

For example, in a case where the capture device 2 (ranging device 1) has an autofocus (AF) function of focusing on a specific subject, a region including the subject extracted by the autofocus function may be selected as the ranging region. The ranging region may be selected according to another image processing or the like executed on the captured image.

Further, one ranging region or a plurality of ranging regions may be selected in Step S3. Further, the ranging region is not necessarily a partial region in the captured image, and may be the entire region of the captured image.

Further, the shape of the ranging region is not necessarily the rectangular shape, and may be, for example, a circular shape or the like.

Next, the image acquisition module 34 acquires a captured image in which the ranging region has been selected in Step S3 (Step S4). Hereinafter, the captured image acquired in Step S4 is referred to as a target captured image.

When the processing in Step S4 is executed, the image correction module 35 performs color correction on the target captured image (Step S5).

Hereinafter, the color correction performed by the image correction module 35 will be specifically described. Note that it is assumed that white balance correction is performed as the color correction in the present embodiment.

First, the target captured image in the present embodiment is the image affected by the aberration of the optical system as described above, but it is known that a color expressed in the target captured image changes (deviation occurs) due to the influence of a color temperature of a light source. Note that the color temperature is a measure representing a color of light emitted from the light source, and the color temperature is different between sunlight as an outdoor light source a fluorescent lamp as an indoor light source, for example. That is, it can be said that (the color expressed in) the target captured image is affected by an environment around the capture device 2. Further, the color expressed in the captured image also changes depending on, for example, a characteristic (sensor RGB characteristic) of the image sensor 22 (first to third sensors 221 to 223).

Specifically, a PSF (point spread function) of a white point illustrated in FIG. 22 is expressed as lens characteristic $h(\lambda) \times$object surface reflection light $S(\lambda)$, and pixel values of RGB (namely, the R image, the G image, and the B image included in the color image) coincide with each other. However, the PSF of the white point is affected by a light source $E(\lambda)$ and a sensor RGB characteristic (sensor sensitivity) $q_c(\lambda)$ as illustrated in FIG. 22. Thus, the PSF depending on the environment represented by the lens characteristic $h(\lambda) \times$the object surface reflection light $S(\lambda) \times$the light source $E(\lambda) \times$the sensor RGB characteristic $q_c(\lambda)$ is observed in the target captured image. Note that the light source $E(\lambda)$ illustrated in FIG. 22 represents a spectral characteristic of a wavelength ($\lambda$) of light from the light source, and the sensor RGB characteristic $q_c(\lambda)$ illustrated in FIG. 22 represents a ratio of maximum values of pixel values in an RGB image.

That is, the PSF of the white point having uniform RGB pixel values should be obtained if there is no influence from the light source and the sensor RGB characteristic, and the PSF (namely, the PSF depending on the environment) in which the deviation occurs in the RGB pixel values is observed in the target captured image.

As described above, the color deviation occurs due to the color temperature of the light source and the sensor RGB characteristic, and the PSF depending on the environment is observed in the target captured image, but there is a case where the accuracy of the distance decreases when the distance (information) is acquired from such a target captured image. Specifically, for example, if different colors are displayed (expressed) according to the color temperature of the light source and the sensor RGB characteristic even in the same color, it is difficult to acquire (estimate) a highly accurate distance. In order to improve the accuracy of the distance in such a case, for example, it is conceivable to generate a statistical model in which bokeh of all colors (color variations) is learned in consideration of the influence of the color temperature of the light source and the sensor RGB characteristic. However, such learning requires a large amount of labor, and thus, it is difficult to improve the environmental robustness when acquiring a distance from an image.

Figure 23:
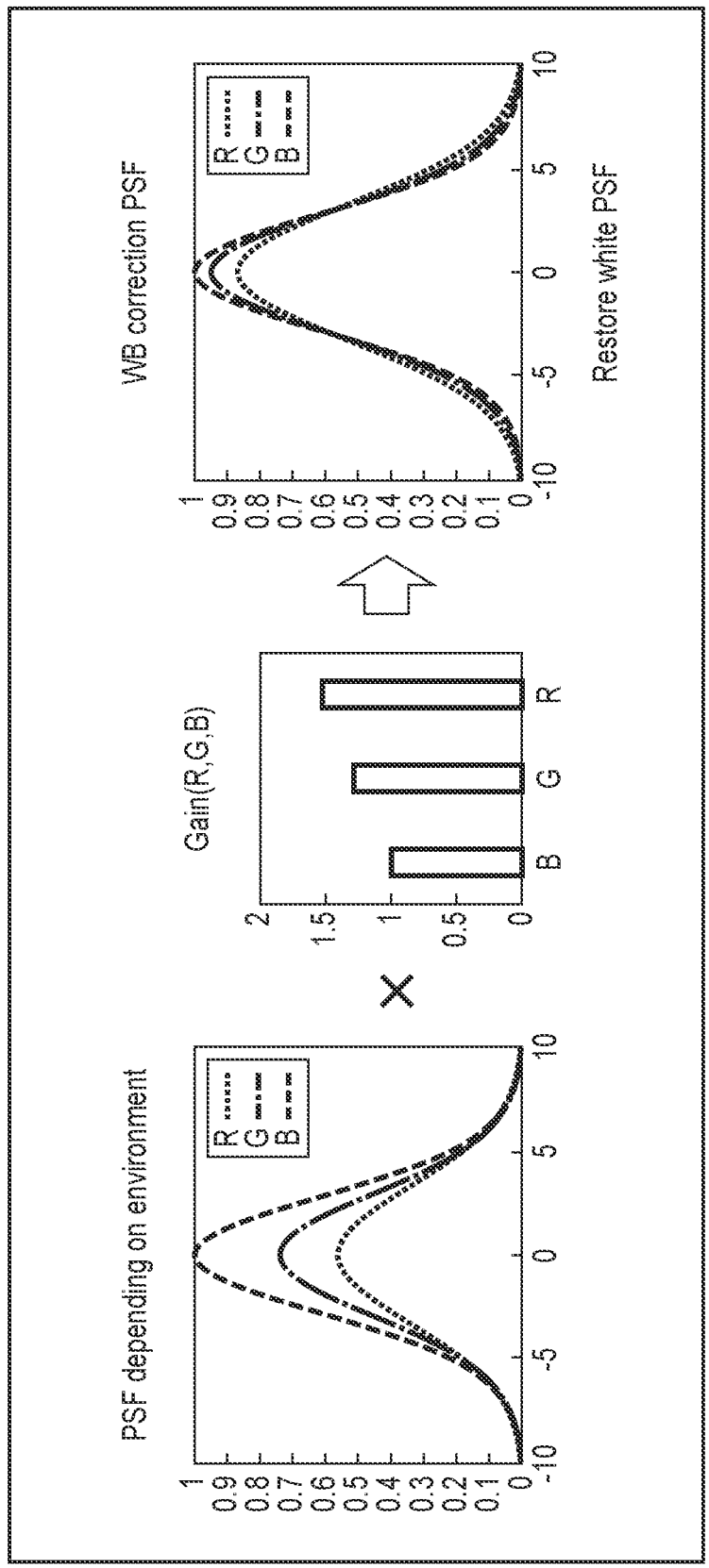
FIG. 23 is a diagram for describing an outline of white balance correction.

Therefore, a correction coefficient for the target captured image (the PSF depending on the environment) is calculated, and correction is performed to restore the above-described white PSF using the correction coefficient in the present embodiment as illustrated in FIG. 23, so that the influence of the color temperature or the like of the light source is absorbed, and the number of colors (color variations) expressed in the target captured image is reduced. Note that the correction coefficient corresponds to a gain value (gain(R, G, B)) to be multiplied by the R image, the G image, and the B image included in the color image in order to make a color such as gray expressed in the color image white, for example.

Note that the above-described white balance correction is performed in units of predetermined regions included in the target captured image. In this case, every pixel included in the target captured image (ranging region), the correction coefficient is calculated based on a pixel value of each of a plurality of pixels included in a region (hereinafter, referred to as a unit region) of a predetermined size including the pixel.

Figure 24:
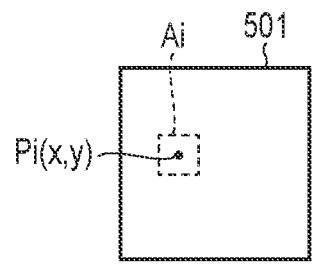
FIG. 24 is a diagram for describing a correction coefficient calculated for a pixel included in a captured image.

Here, a correction coefficient calculated for a pixel $P_i$ included in the target captured image 501 as illustrated in FIG. 24 will be described.

First, the image correction module 35 specifies a unit region $A_i$ having a predetermined size including the pixel $P_i$. In this case, for example, the unit region $A_i$ having a rectangular shape in which the pixel $P_i$ is located at the center is specified, but the unit region $A_i$ in which the pixel $P_i$ is located at a corner may be specified, or the unit region $A_i$ having a shape other than the rectangular shape may be specified.

Next, the image correction module 35 acquires a pixel value of each of a plurality of pixels included in the specified unit region $A_i$ from the target captured image 501. The plurality of pixels included in the unit region $A_i$ also include the pixel $P_i$. Note that, when the target captured image 501 is a color image as described above, each of the pixel values acquired by the image correction module 35 includes a pixel value of an R image, a pixel value of a G image, and a pixel value of a B image included in the color image.

The image correction module 35 calculates an average value of pixel values of the R images (hereinafter, expressed as an average pixel value of the R images) based on the acquired pixel values of the R images included in each of the plurality of pixels. Similarly, the image correction module 35 calculates an average value of pixel values of the G images (hereinafter, expressed as an average pixel value of the G images) based on the acquired pixel values of the G images included in each of the plurality of pixels. Further, the image correction module 35 calculates an average value of pixel values of the B images (hereinafter, expressed as an average pixel value of the B images) based on the acquired pixel values of the B images included in each of the plurality of pixels.

Further, the image correction module 35 specifies a maximum value among the calculated average pixel value of the R image, average pixel value of the G image, and average pixel value of the B image (hereinafter, expressed as a maximum value of the RGB average pixel values).

In this case, the correction coefficient for the pixel $P_i$ is calculated by the following Formula (1).

$$\text{gain}(R, G, B) = \frac{\max(R_{ave}, G_{ave}, B_{ave})}{(R_{ave}, G_{ave}, B_{ave})} \qquad \text{Formula (1)}$$

In Formula (1), gain(R, G, B) represents the correction coefficient (gain value) for the pixel $P_i$ (pixel value of each of the R image, the G image, and the B image). $R_{ave}$ represents the average pixel value of the R image, $G_{ave}$ represents the average pixel value of the G image, and $B_{ave}$ represents the average pixel value of the B image. Further, $\max(R_{ave}, G_{ave}, B_{ave})$ represents the maximum value of the RGB average pixel values.

That is, a value, obtained by dividing the maximum value of the RGB average pixel values by the average pixel value of the R image, is a correction coefficient (hereinafter, expressed as gain(R)) for the pixel value of the R image included in the pixel value of the pixel $P_i$ in the present embodiment. Further, a value, obtained by dividing the maximum value of the RGB average pixel values by the average pixel value of the G image, is a correction coefficient (hereinafter, expressed as gain(G)) for the pixel value of the G image included in the pixel value of the pixel $P_i$. Further, a value, obtained by dividing the maximum value of the RGB average pixel values by the average pixel value of the B image, is a correction coefficient (hereinafter, expressed as gain(B)) for the pixel value of the B image included in the pixel value of the pixel $P_i$.

When the correction coefficient for the pixel $P_i$ is calculated as described above, the pixel value of the pixel $P_i$ is corrected using the correction coefficient. Specifically, assuming that the pixel value of the R image, the pixel value of the G image, and the pixel value of the B image included in the pixel value of the pixel $P_i$ are $P_i(R, G, B)$, and the pixel value of the pixel $P_i$ after the white balance correction is performed is $P_i'(R, G, B)$, $P_i'(R, G, B)$ is calculated by the following Formula (2).

$$P_i' = P_i(R,G,B) \times \text{gain}(R,G,B) \qquad \text{Formula 2}$$

That is, if the white balance correction is performed, the pixel value $P_i(R, G, B)$ of the pixel $P_i$ is corrected to the pixel value $P_i'(R, G, B)$ including a value obtained by multiplying the pixel value of the R image included in the pixel value of the pixel $P_i$ by gain(R), a value obtained by multiplying the pixel value of the G image included in the pixel value of the pixel $P_i$ by gain(G), and a value obtained by multiplying the pixel value of the B image included in the pixel value of the pixel $P_i$ by gain(B).

Although the pixel $P_i$ included in the target captured image 501 has been described here, similar processing is executed for other pixels included in the target captured image 501.

Note that the pixel whose pixel value is corrected is at least the pixel included in the ranging region as described above, but pixel values of all the pixels included in the target captured image may be corrected.

Although the unit region is described as a partial region of the target captured image including the pixel whose pixel value is corrected here, the unit region may be the entire region of the target captured image.

Note that, for example, in a case where an image rich in color variations is the target captured image, it is possible to perform effective white balance correction by using a minute region as the unit region. However, the distance to the subject is acquired (estimated) with the bokeh occurring in the target captured image as the physical clue in the present embodiment, and thus, a region that does not affect the relationship between the aberration of the optical system and the distance to the subject (namely, does not change the color or the like of the bokeh) is preferably set as the unit region. Note that the region that does not affect the relationship between the aberration of the optical system and the distance to the subject includes, for example, a region having a size including the bokeh that occurs in the target captured image. Since the distance (namely, the size of the bokeh) to the subject included in the ranging region is unknown at the time when the processing in Step S5 described above is executed, for example, a region having such a size that can include the bokeh that is likely to occur in the target captured image (ranging region) is set as the unit region. Since the bokeh occurring in the target captured image has the positional dependence, the size of the unit region may be determined based on, for example, the position of the ranging region or the like.

Referring to FIG. 19 again, the distance acquisition module 36 acquires the distance information indicating the distance to the subject included in the ranging region based on the above-described ranging region information and the target captured image after having been subjected to the white balance correction (color correction) in Step S5 (Step S6).

In this case, the distance acquisition module 36 inputs information (gradient data) regarding the ranging region indicated by the ranging region information into the statistical model stored in the statistical model storage 31. As a result, the distance to the subject in the ranging region is estimated in the statistical model, and the statistical model outputs the estimated distance. Note that the distance to the subject is estimated and output for each of pixels constituting the ranging region. As a result, the distance acquisition module 36 can acquire the distance information indicating the distance output from the statistical model.

Figure 25:
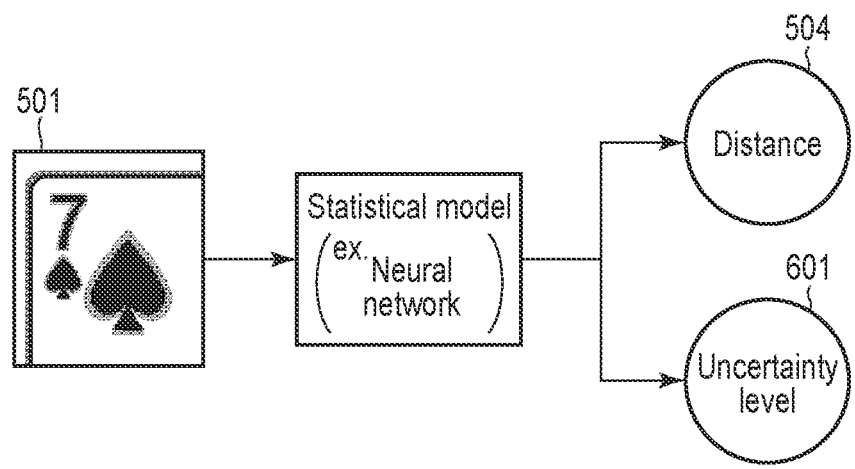
FIG. 25 is a diagram for describing an uncertainty level calculated by the statistical model.

Here, there is a case where the statistical model is constructed (generated) such that the level of uncertainty (hereinafter, expressed as uncertainty level) 601 of the estimation is calculated for each pixel, and the uncertainty level 601 is output together with the distance 504 when the distance 504 is estimated from the information regarding the captured image (target captured image) 501, for example, as illustrated in FIG. 25. A method of calculating the uncertainty level 601 is not limited to a specific method, and various known methods can be applied.

In this case, the distance acquisition module 36 acquires the uncertainty level together with the distance information acquired in Step S6 (Step S7).

Meanwhile, when the user performs an operation of pressing the reliability confirmation mode button 306d provided on the preview screen 306a illustrated in FIG. 20, the reliability confirmation mode setting module 37 sets the reliability confirmation mode. Note that the timing at which the user performs the operation of pressing the reliability confirmation mode button 306d may be, for example, the timing at which the preview display is performed in Step S1 described above, or may be, for example, after execution of the processing in Step S7. When the reliability confirmation mode is set by the reliability confirmation mode setting module 37, information (hereinafter, referred to as a reliability confirmation mode setting flag) indicating that the reliability confirmation mode is set is held inside the image processing device 3.

When Step S7 described above is executed, whether the reliability confirmation mode is set based on the reliability confirmation mode setting flag is determined (Step S8).

When it is determined that the reliability confirmation mode is set (YES in Step S8), the display processing module 32 performs the preview display of the uncertainty level acquired in Step S7 (Step S9).

Figure 26:
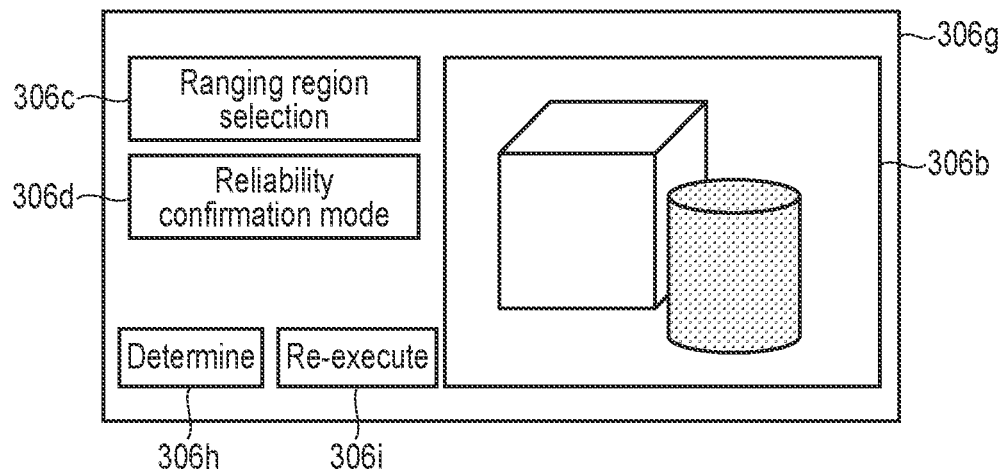
FIG. 26 is a view illustrating an exemplary preview screen in a case where a reliability confirmation mode is set.

In this case, the preview screen 306e illustrated in FIG. 21 described above transitions to a preview screen 306g illustrated in FIG. 26.

As illustrated in FIG. 26, in the image display region 306b provided on the preview screen 306g, the uncertainty level calculated for each pixel as described above is displayed as the reliability to be superimposed on the target captured image.

Note that a case where an uncertainty level calculated for a specific pixel is high in the present embodiment indicates that the reliability of the distance to the subject corresponding to the specific pixel is low. On the other hand, a case where an uncertainty level calculated for a specific pixel is low indicates that the reliability of the distance to the subject corresponding to the specific pixel is high.

In the image display region 306b, the uncertainty level is displayed in a different color in accordance with the uncertainty level. As a result, the user can intuitively grasp the uncertainty level (reliability) displayed on the target captured image.

Note that the uncertainty level may be represented by, for example, color shading or the like in accordance with the uncertainty level, or may be displayed by processing the ranging region or a contour (edge portion) of the subject included in the ranging region (for example, changing the thickness of the contour). Further, the uncertainty level may be simply displayed as a numerical value or the like, or may be displayed in another format.

Here, the preview screen 306g is further provided with a determination button 306h and a re-execution button 306i. The determination button 306h is a button configured to instruct output of the distance information acquired in Step S6. The re-execution button 306i is a button configured to instruct re-execution of acquisition of the distance information.

The user refers to the preview screen 306g (image display region 306b) on which the uncertainty (reliability) is displayed as described above, and performs the operation of pressing the determination button 306h (namely, operation of instructing the output of the distance information) when it can be determined that the reliability of the distance to the subject included in the ranging region is high (namely, the uncertainty level is low). On the other hand, the user performs an operation of pressing the re-execution button 306i again (namely, operation of instructing the re-execution of acquisition of the distance information) when it can be determined that the reliability of the distance to the subject included in the ranging region is low (namely, the uncertainty level is high).

In this case, the distance acquisition module 36 determines whether or not to output the distance information acquired in Step S6 according to the operation of the user (Step S10). In Step S10, it is determined that the distance information is to be output when the operation of pressing the determination button 306h is performed on the preview screen 306g, and it is determined that the distance information is not to be output when the operation of pressing the re-execution button 306i is performed.

When it is determined that the distance information is to be output (YES in Step S10), the output module 38 outputs the distance information acquired in Step S6 (Step S11). In this case, the output module 38 can output the distance information as image data in a map format arranged in positional association with the ranging region in the target captured image (image data including pixels whose pixel values are distances indicated by the distance information). Note that the distance information may be output simply as a numerical value or the like, or may be output in another format.

Further, the distance information may be displayed on the above-described preview screen, or may be displayed on a screen different from the preview screen. Further, the distance information may be displayed in combination with the target captured image, for example. Further, the distance information may be stored in a server device or the like inside or outside the image processing device 3.

On the other hand, when it is determined that the distance information is not to be output (NO in Step S10), the process is repeated by returning to Step S5. In this case, the size of the unit region on which the white balance correction has been performed (used to calculate the correction coefficient) in Step S5 described above is changed, and the processing in Step S5 is executed again.

Here, the unit region where the white balance correction is performed is preferably the region that does not affect the relationship between the aberration of the optical system and the distance to the subject (namely, the color or the like of the bokeh is not changed) as described above. However, since the distance (namely, the size of the bokeh) to the subject is unknown at the time when the processing in Step S5 is executed, the white balance correction is performed using, as the unit region, a region having such a size that can include the bokeh that is likely to occur in the captured image (ranging region) in Step S5. On the other hand, the processing in Step S6 described above is executed to estimate the size of the bokeh by the statistical model in the processing in Step S5 executed again. Therefore, in Step S5 executed again, the region having the size including the bokeh (namely, the bokeh occurring in accordance with the distance to the subject included in the ranging region) estimated by the statistical model is set as the unit region. As a result, more effective white balance correction can be performed in the unit region (minute region) suitable for the size of the bokeh actually occurring in the target captured image, and thus, it can be expected that the distance information indicating the distance with a low uncertainty level (namely, high reliability) is acquired in Step S6 to be executed again later.

That is, in a case where the processing in Step S5 is repeatedly executed in the present embodiment, the correction coefficient is calculated (namely, the unit region is changed) such that the uncertainty level (or a ratio of pixels for which the distance with low uncertainty is estimated) decreases.

Here, the description has been given assuming that the process is executed by returning to Step S5 when the operation of pressing the re-execution button 306i is performed. However, in the case where the operation of pressing the re-execution button 306i is performed, for example, the process may return to Step S3 and a different ranging region may be selected again.

Further, the description has been mainly given assuming that one statistical model is stored in the statistical model storage 31 in the present embodiment, but a plurality of statistical models may be stored in the statistical model storage 31. Specifically, the PSF shape particularly in the vicinity of the end portion of the image is greatly different depending on the type of lens as described above. Thus, there is a case where the accuracy of the distance acquired from the image decreases in the configuration in which the distance information is acquired using one statistical model generated without considering the type of lens. Therefore, the statistical model storage 31 may store, for example, a statistical model for each lens. In such a configuration, when the operation of pressing the re-execution button 306i is performed as described above, the statistical model used in the processing in Step S6 described above may be changed to, for example, a statistical model corresponding to the lens 21 specified by lens information (specification value of the lens 21). Note that, when the statistical model is changed in this manner, for example, an aberration map or the like obtained by analyzing the target captured image may be used. In this case, it is possible to make a change to the statistical model corresponding to the aberration map, obtained by analyzing the target captured image, by associating the aberration map and an appropriate statistical model with an image from which the aberration map is obtained in advance. Further, the statistical model may be changed according to the distance information acquired in Step S6.

For example, the statistical model is changed to a statistical model which has learned an image subjected to color correction in a unit region including a bokeh size of distance information obtained once.

Figure 19:
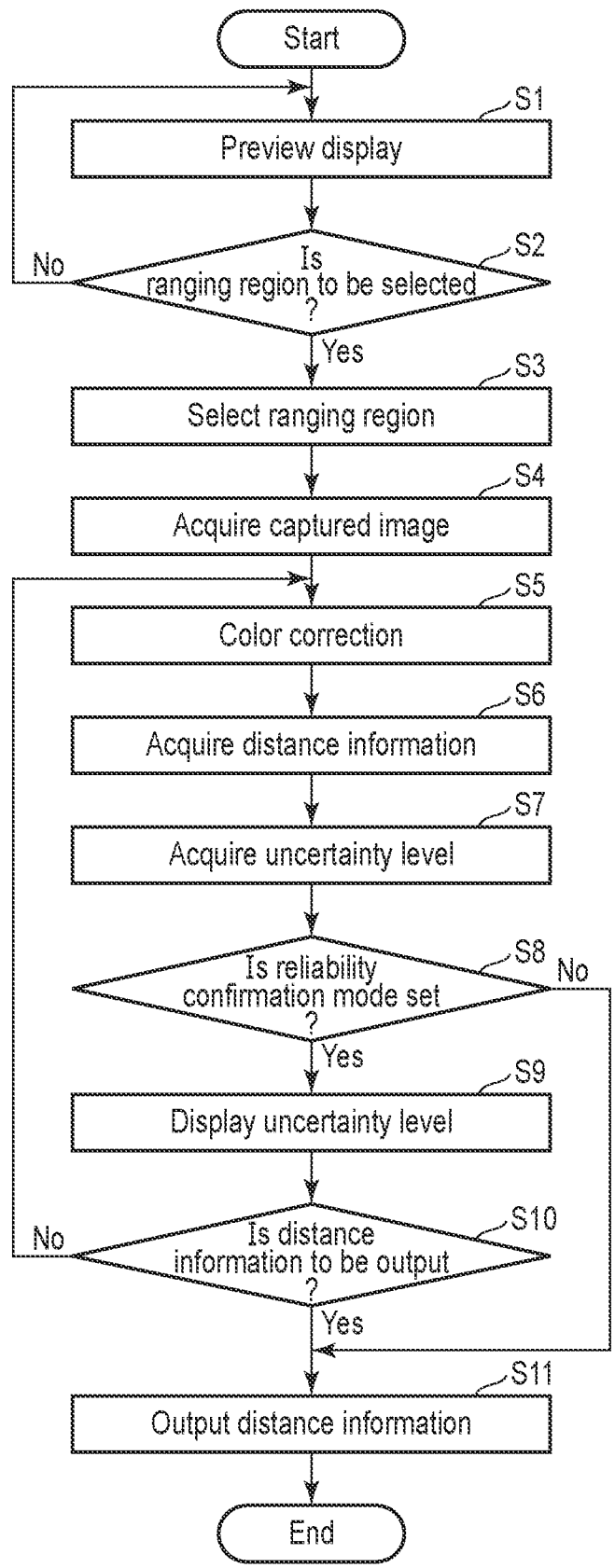
FIG. 19 is a flowchart illustrating an exemplary processing procedure of the image processing device when distance information is acquired from a captured image.

Note that, when the statistical model is changed as described above, the processing in Step S36 and the subsequent steps may be executed without changing the unit region (correction coefficient) although not illustrated in FIG. 19.

On the other hand, when it is determined in Step S8 that the reliability confirmation mode is not set (NO in Step S8), the processing in Steps S9 and S10 is not executed, and the processing in Step S11 is executed. In this case, for example, among the pieces of distance information acquired in Step S6, only the distance information indicating the distance whose uncertainty level is equal to or lower than a threshold (reliability equal to or higher than a threshold) can be output (namely, the distance information indicating the distance whose uncertainty level is not equal to or lower than the threshold can be discarded), but all the pieces of distance information acquired in Step S6 may be output.

According to the process illustrated in FIG. 19 described above, the distance information and the uncertainty level are acquired using the statistical model, and the uncertainty level (reliability) is displayed on the preview screen after the ranging region is selected based on the operation of the user and the white balance correction is performed on the target captured image. However, such a series of operations may be performed interactively. For example, in a case where the image processing device 3 (ranging device 1) is implemented by a smartphone or the like, the user can perform operations of designating a ranging region while referring to a preview screen, acquiring distance information again when the reliability of distance included in the ranging region is low, and outputting the distance information when desired distance information is obtained.

Note that the description has been given assuming that the ranging region is selected according to the operation of the user on the preview screen (image display region) in the present embodiment. However, the ranging region may be the entire region of the captured image or a region including the subject automatically extracted by image processing, regardless of the operation of the user. In this case, the ranging region selection module 33 illustrated in FIG. 1 may be omitted, and the processing in Steps S2 and S3 illustrated in FIG. 19 may be omitted.

Further, the description has been given assuming that the reliability confirmation mode is set according to the operation of the user in the present embodiment, but an operation in which the reliability confirmation mode is set constantly or an operation in which the reliability confirmation mode is not set constantly may be performed. In this case, the reliability confirmation mode setting module 37 illustrated in FIG. 1 may be omitted. Further, when the operation in which the reliability confirmation mode is set constantly is performed, the processing in Step S8 illustrated in FIG. 19 is omitted. On the other hand, when the operation in which the reliability confirmation mode is not set constantly is performed, the processing from Steps S8 to S10 illustrated in FIG. 19 is omitted.

Further, the description has been given assuming that the statistical model is constructed (generated) so as to calculate the uncertainty level in the present embodiment, but the statistical model may be constructed so as not to calculate the uncertainty level at the time of estimating the distance to the subject. In this case, for example, the processing from Steps S7 to S10 illustrated in FIG. 19 can be omitted.

Further, a use mode in which the user operates the image processing device 3 (ranging device 1) while referring to the preview screen is assumed in the present embodiment. However, the present embodiment may be configured to execute simpler processing for simply outputting the distance information indicating the distance to the subject included in the captured image captured by the capture device 2 without performing preview display. In this case, the processing from Steps S4 to S6 and S11 illustrated in FIG. 19 may be executed.

As described above, it is possible to acquire the distance from the captured image to the subject using the statistical model in the present embodiment, but the statistical model is generated by executing a learning process.

Figure 27:
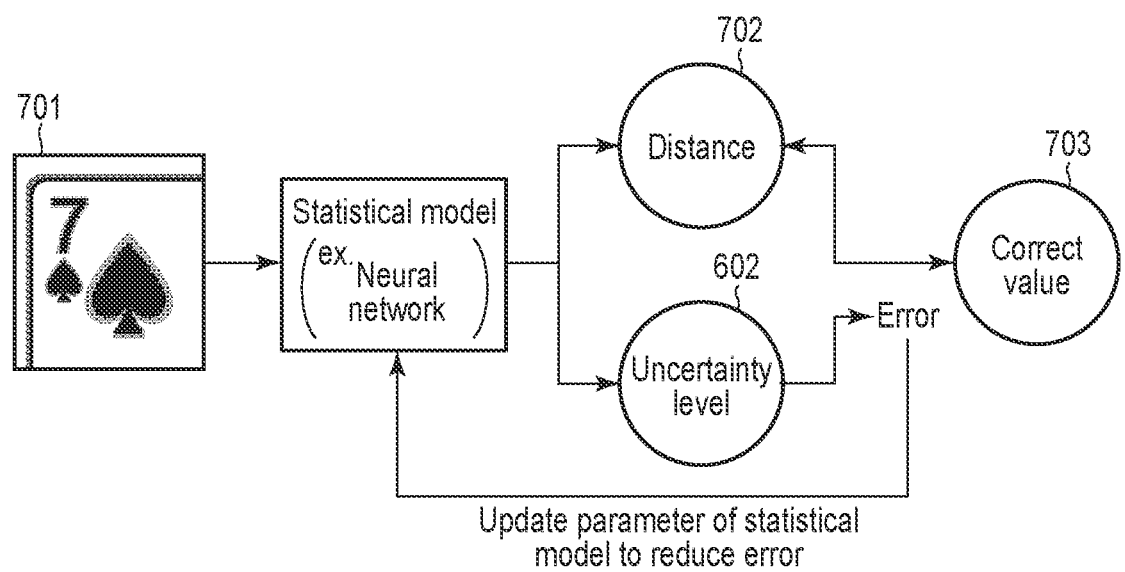
FIG. 27 is a diagram illustrating an exemplary learning process of the statistical model.

Hereinafter, the learning process for generating the statistical model (hereinafter, simply referred to as the learning process of the statistical model) will be described. FIG. 27 illustrates an exemplary learning process (learning method) of the statistical model in the present embodiment. Herein, the learning process of the statistical model with the image captured by the capture device 2 will be described. However, for example, the learning process of the statistical model may be carried out with an image captured by a different device (e.g., a camera) having an optical system similar to the optical system of the capture device 2.

Note that the image captured by the capture device 2 to acquire the distance information is referred to as the captured image in the above description. In the present embodiment, however, an image for the statistical model to learn bokeh that varies non-linearly according to the distance is referred to as an image for learning for the sake of convenience.

Even in a case where any method is used from the first method described with reference to FIG. 13, the second method described with reference to FIG. 15, and the third method described with reference to FIG. 17, the learning process of the statistical model is carried out basically by inputting information regarding an image for learning 701 into the statistical model and feeding an error between a distance (distance information) 702 estimated by the statistical model and a correct value 703 back to the statistical model. Note that the feedback refers to updating a parameter (for example, weighting factor) of the statistical model so as to reduce the error.

In a case where the first method is applied as the method of estimating the distance from the above-described captured image, the information regarding the local region (gradient data) is input into the statistical model every local region (image patch) extracted from the image for learning 701 even during the learning process of the statistical model. Accordingly, the distance 702 is estimated based on each pixel in each local region by the statistical model. The error acquired by comparison between the distance 702 estimated as above and the correct value 703, is fed back to the statistical model.

Similarly, in a case where the second method is applied as the method of estimating the distance from the captured image, the gradient data and the positional information as the information regarding the local region are input into the statistical model every local region (image patch) extracted from the image for learning 701 even during the learning process of the statistical model. Accordingly, the distance 702 is estimated based on each pixel in each local region by the statistical model. The error acquired by comparison between the distance 702 estimated as above and the correct value 703, is fed back to the statistical model.

In a case where the third method is applied as the method of estimating the distance from the captured image, the information regarding the entire region of the image for learning 701 (gradient data) is collectively input into the statistical model even during the learning process of the statistical model. Accordingly, the distance 702 is estimated based on each pixel in the image for learning 701 by the statistical model. The error acquired by comparison between the distance 702 estimated as above and the correct value 703, is fed back to the statistical model.

Note that, in a case where the information regarding the image for learning 701 is input into the statistical model as described above, it is assumed that the uncertainty level 602 with respect to the distance 702 is calculated similarly to the case described above with reference to FIG. 25. It is assumed that an error obtained by dividing the error between the distance 702 and the correct value 703 by the square of the uncertainty level 602 is fed back in the learning process of the statistical model in this case. In this case, the error becomes zero when the uncertainty level 602 is set to infinity, and thus, the square of the uncertainty level 602 is added to the error as a penalty.

According to the learning process of the statistical model described above, the parameter (for example, weighting factor) of the statistical model is updated such that a value obtained by correcting the error between the distance 702 and the correct value 703 with the uncertainty level 602 decreases.

Here, for example, in a case where there is no error between the distance 702 estimated by the statistical model and the correct value 703 but the uncertainty level 602 is high, it can be estimated that there is a possibility that the distance 702 has been estimated by chance. In this case, it is possible to recognize that the learning of the distance 702 (correct value 703) is insufficient.

When the uncertainty level calculated by the statistical model is used in this manner, it is also possible to reduce a learning bias.

For example, the statistical model in the present embodiment is generated by repeatedly carrying out the learning process with the image for learning captured while the distance from the capture device 2 to the subject is varied with the focal point fixed. In a case where the learning process has been completed for one focal point, the learning process is carried out similarly for another focal point, so that a higher-accuracy statistical model can be generated.

Further, the description has been given assuming that the estimation of the distance and the estimation of the color, size, and shape of the bokeh are synonymous in FIG. 18 described above. However, in a case where the information regarding the image for learning is input into the statistical model at the time of learning of the statistical model, (positive or negative bokeh values indicating) the color, size, and shape of the bokeh corresponding to the actual distance to the subject when the image for learning is captured is used as the correct value. The statistical model in which such learning is carried out, outputs the bokeh value as the distance to the subject in the image.

Next, an exemplary processing procedure of the process of generating the statistical model used in the image processing device 3 (namely, the learning process of the statistical model) according to the present embodiment will be described with reference to a flowchart of FIG. 28. Note that, for example, the process illustrated in FIG. 28 may be performed in the image processing device 3 or may be performed in a different device.

First, an image for learning prepared in advance is acquired (Step S21). For example, the image for learning is an image generated by the image sensor 22, based on the light having passed through the lens 21 included in the capture device 2, the image being affected by the aberration of the optical system (lens 21) of the capture device 2. Specifically, the image for learning includes the bokeh that varies non-linearly in accordance with the distance to the subject, described in FIGS. 4 to 10.

Note that it is assumed that the image for learning, obtained by capturing the subject at each distance with as fine granularity as possible from a lower limit value (near side) to an upper limit value (far side) of the distance that can be acquired (estimated) by the image processing device 3, is prepared in advance in the learning process of the statistical model. Further, as the image for learning, it is preferable to prepare various images having different subjects.

Here, (the distance information indicating) the distance to the subject is acquired from the captured image after having been subjected to the color correction (white balance correction) as described above in the present embodiment. Therefore, it is assumed that the color correction is similarly performed on the image for learning acquired in Step S1 (Step S22). Note that the processing in Step S22 is not essential, but it is preferable to perform the color correction even on the image for learning in order to improve the accuracy of the distance estimated in the statistical model described above. Since the processing in Step S22 is the same processing as the processing in Step S5 illustrated in FIG. 19 described above, the detailed description thereof will be omitted here.

If the processing in Step S22 is executed, information regarding the image for learning after having been subjected to the color correction in Step S22 is input into the statistical model (Step S23).

In a case where the first method is applied as the method of estimating the distance from the captured image, as the information regarding the image for learning, every local region of the image for learning, the pieces of gradient data of the R image, the G image, and the B image are input into the statistical model.

In a case where the second method is applied as the method of estimating the distance from the captured image, as the information regarding the image for learning, every local region of the image for learning, the pieces of gradient data of the R image, the G image, and the B image together with the positional information regarding the local region on the image for learning are input into the statistical model.

In a case where the third method is applied as the method of estimating the distance from the captured image, as the information regarding the image for learning, the pieces of gradient data of the R image, the G image, and the B image for the entire region of the image for learning are input into the statistical model.

Note that, in the present embodiment, the description in which the pieces of gradient data of the R image, the G image, and the B image are input into the statistical model, is given. However, in a case where the distance is estimated from the viewpoint of the shape of the bokeh (PSF shape) that occurs in the image for learning, at least one piece of gradient data of the pieces of gradient data of the R image, the G image, and the B image, needs to be input into the statistical model. Meanwhile, in a case where the distance is estimated from the viewpoint of the color and size of the bokeh that occurs in the image for learning due to the chromatic aberration, at least two pieces of gradient data of the pieces of gradient data of the R image, the G image, and the B image, need to be input into the statistical model. In a case of using gradient data of two colors, color correction may be performed to make the two colors have the same balance. Such a configuration can contribute to reduction in processing cost.

When the information regarding the image for learning is input into the statistical model, the distance to the subject is estimated by the statistical model (Step S24). In this case, the bokeh occurring in the image for learning is extracted from the image for learning by the statistical model, so that the distance corresponding to the bokeh is estimated.

If the processing in Step S24 is executed, the statistical model calculates an uncertainty level for the distance estimated in Step S24 (Step S25).

The distance estimated at Step S24 is compared with the correct value acquired at the time of capturing of the image for learning (Step S26).

The comparison result (error) in Step S25 is corrected using the uncertainty level calculated in Step S25 and fed back to the statistical model (Step S27). Thus, a parameter in the statistical model is updated such that the error is reduced (namely, learning of the bokeh occurring in the image for learning is carried out).

The processing illustrated in FIG. 28 is repeatedly performed every image for learning, resulting in generation of the statistical model having learned the bokeh that varies non-linearly in accordance with the distance to the subject in the image for learning. The statistical model generated in this manner is stored in the statistical model storage 31 included in the image processing device 3.

Herein, the learning process of one statistical model has been described. In a case where the statistical model for each lens (namely, the plurality of statistical models) is stored in the statistical model storage 31, for example, the process illustrated in FIG. 28 described above may be executed for each lens (image for learning captured using the lens).

As described above, in the present embodiment, the captured image (second image) affected by the aberration of the optical system is acquired, the color correction is performed on the captured image to reduce the number of colors (namely, color variations) expressed in the captured image; the captured image (third image) after having been subjected to the color correction is input into the statistical model, and the distance information (first distance information) indicating the distance to the subject in the captured image is acquired.

The captured image, captured by the capture device 2, is affected by the color temperature of the light source or the like (namely, the environment around the capture device 2). In the present embodiment, it is possible to improve the accuracy of the distance acquired from the captured image (distance estimated in the statistical model) and the environmental robustness when the distance is acquired from the captured image by reducing the color variation of the captured image with the above-described configuration.

Further, the present embodiment is configured such that the distance information indicating the distance to the subject is acquired from the captured image in which the color (namely, the pixel value) changed due to the influence of the color temperature of the light source and the like has been corrected. Thus, it is unnecessary to learn bokeh of all colors (color variations) in consideration of the influence of the color temperature of the light source and the like, and it is possible to reduce the burden on the learning process of the statistical model.

Although the white balance correction is performed in units of regions (first regions) of a predetermined size included in the captured image in the present embodiment, the region (unit region) where the white balance correction is performed is preferably the region that does not affect the relationship between the aberration of the optical system and the distance to the subject since the present embodiment is configured such that the distance is estimated (acquired) using the bokeh occurring in the captured image as the physical clue regarding the distance to the subject. The region that does not affect the relationship between the aberration of the optical system and the distance to the subject is assumed to be, for example, a region having a size including at least bokeh that occurs in accordance with the distance to the subject. As a result, a color of the bokeh is not changed by performing the white balance correction, and thus, it is possible to suppress the white balance correction from being a factor that lowers the accuracy of the distance.

Further, in the present embodiment, for example, a correction coefficient (first correction coefficient) for a first pixel is calculated based on pixel values of a plurality of second pixels included in a unit region including the first pixel, and color correction (white balance correction) is performed on a pixel value of the first pixel using the correction coefficient, so that the pixel value can be appropriately corrected for each of pixels (pixels included in the ranging region) constituting the captured image.

When the reliability confirmation mode is set in the present embodiment, white balance correction is performed again in a unit region (second region) different in size from the unit region (first region) used when the white balance correction has been performed, according to an operation of the user based on the uncertainty level (uncertainty level) with respect to the distance estimated by the statistical model. According to such a configuration, there is a possibility that the distance information indicating the distance with higher accuracy (a lower uncertainty level) can be acquired.

Although the description has been given in the present embodiment assuming that, for example, the white balance correction is performed again using the region having the size including the size of the bokeh estimated by the statistical model as the unit region, it suffices that the unit region is changed so as to reduce the uncertainty level. In this case, it may be configured such that the processing is repeated until the uncertainty level decreases (for example, the user performs the operation of pressing the determination button provided on the preview screen) while arbitrarily changing the unit region.

Further, the user refers to an uncertainty level (second uncertainty level) of a distance indicated by distance information (second distance information) acquired from the captured image (fourth image) after the white balance correction has been performed again. In a case where the uncertainty level is low, the acquired distance information is output according to the operation of the user based on the uncertainty level. According to such a configuration, it is possible to output the distance information (for example, distance information indicating the distance with the low uncertainty level) intended by the user.

Note that it may be configured such that only distance information whose uncertainty level is equal to or lower than the threshold is output (namely, the distance information in which the uncertainty level is not equal to or lower than the threshold is discarded) in a case where the reliability confirmation mode is not set.

In the present embodiment, a ranging region (third region) in the captured image is selected, color correction is performed on the ranging region, and distance information indicating a distance to the subject in the ranging region is acquired, so that it is possible to output the distance information indicating the distance to the subject intended by the user. In this case, a region designated by an operation of the user may be selected as the ranging region, or a region including the subject detected based on a position in the captured image designated by the operation of the user may be selected as the ranging region.

Although the description has been mainly given assuming that the white balance correction is performed as the color correction in the present embodiment, the present embodiment may be configured such that color correction is performed to reduce color variations occurring in the captured image in accordance with the surrounding environment of the capture device 2 including the color temperature of the light source and the like described above.

Second Embodiment

Next, a second embodiment will be described. In the present embodiment, detailed descriptions of the same parts as those of the first embodiment described above will be omitted, and parts different from those of the first embodiment will be mainly described.

FIG. 29 illustrates an exemplary configuration of a ranging system including an image processing device according to the present embodiment. In FIG. 29, the same parts as those in FIG. 1 described above will be denoted by the same reference signs, detailed descriptions thereof will be omitted, and parts different from those in FIG. 1 will be described.

As illustrated in FIG. 29, an image processing device 3 according to the present embodiment is different from that of the first embodiment in terms of including an evaluation module 39, instead of the reliability confirmation mode setting module 37 described in the first embodiment.

Note that the image processing device 3 according to the present embodiment has the hardware configuration illustrated in FIG. 2 described above, and a part or the whole of the evaluation module 39 is implemented by causing a CPU 301 (namely, a computer of the image processing device 3) to execute an image processing program 303A, that is, by software. Further, a part or the whole of the evaluation module 39 may be implemented by hardware such as an integrated circuit (IC), or may be implemented by a combination of software and hardware.

The evaluation module 39 evaluates distance information acquired by a distance acquisition module 36 based on an uncertainty level described in the first embodiment described above. In the present embodiment, color correction by an image correction module 35 is performed again based on an evaluation result of the evaluation module 39.

Next, an exemplary processing procedure of the image processing device 3 when distance information is acquired from a captured image will be described with reference to a flowchart of FIG. 30.

First, processing in Steps S31 to S33 corresponding to the processing in Steps S1 to S3 illustrated in FIG. 19 described above is performed.

Here, when the processing in Step S33 is executed, for example, a threshold of an uncertainty level is set according to an operation of a user (Step S34).

When the processing of Step S33 is executed, processing of Steps S35 to S38 corresponding to the processing of Steps S4 to S7 illustrated in FIG. 19 is executed.

Next, the evaluation module 39 determines whether or not the uncertainty level acquired in Step S38 is equal to or lower than a threshold set in Step S34 in order to evaluate the distance information acquired by the distance acquisition module 36 (Step S39).

Note that the uncertainty level for the distance estimated for each pixel included in a ranging region (namely, the uncertainty level for each pixel) is acquired in Step S38 described above. In Step S39, however, for example, it is determined whether or not a representative value (for example, an average value or the like) of uncertainty levels of a plurality of pixels included in the ranging region is equal to or lower than a threshold.

When it is determined that (the representative value of) the uncertainty level is not equal to or lower than the threshold (NO in Step S39), the process is repeated by returning to Step S36 (namely, the processing in Step S36 is executed again). Note that the processing in Step S36 executed again here is similar to the processing in Step S5 executed again that has been described above with reference to FIG. 19, and thus, a detailed description thereof will be omitted here.

On the other hand, when it is determined that (the representative value of) the uncertainty level is equal to or lower than the threshold (YES in Step S39), the processing in Step S40 corresponding to the processing in Step S11 illustrated in FIG. 19 described above is executed.

Although the distance information is output according to the operation of the user who has referred to (confirmed) the uncertainty level (reliability) in the first embodiment described above, the white balance correction is performed again when the uncertainty level is not equal to or lower than the threshold set by the user, and the distance information is automatically output when the uncertainty level is equal to or lower than the threshold in the present embodiment as described above. According to such a configuration, the distance information with reliability desired by the user can be obtained together with the accuracy of the distance acquired from the image, the environmental robustness when the distance is acquired from the image, so that the practicality can be also improved.

Note that the description has been given assuming that whether or not the representative value of the uncertainty level for each of pixels constituting the ranging region is equal to or lower than the threshold is determined in Step S38 illustrated in FIG. 30 described above. However, it may be determined, for example, whether or not a ratio of pixels whose uncertainty levels are equal to or lower than a first threshold relative to all the pixels constituting the ranging region is equal to or higher than a second threshold. According to such a configuration, the process is repeated by returning to Step S35 when the ratio of the pixels whose uncertainty levels are equal to or lower than the first threshold relative to all the pixels included in the ranging region is not equal to or higher than the second threshold, and the processing in Step S39 is executed when the ratio of pixels whose uncertainty levels are equal to or lower than the first threshold relative to all the pixels included in the ranging region is equal to or higher than the second threshold.

Further, the processing in Step S38 may be executed, for example, in units of small regions (hereinafter, referred to as divided regions) obtained by dividing the ranging region. Specifically, the processing in Step S38 is executed for each of the divided regions, and the process is repeated by returning to Step S35 only for a divided region for which it is determined that the uncertainty level is not equal to or lower than the threshold. According to such a configuration, it is possible to perform the optimum white balance correction while referring to the uncertainty level in units of the divided regions obtained by dividing the ranging region, and to integrate and output results (distance information) in units of the divided regions.

For example, the processing in Steps S35 to S37 may be repeatedly executed a predetermined number of times in the processing illustrated in FIG. 30, and whether or not the processing has been executed a predetermined number of times may be determined in Step S38. In this case, a plurality of pieces of distance information are acquired by executing the processing in Steps S35 to S37 the predetermined number of times, but distance information having the minimum uncertainty level among the plurality of pieces of distance information is output in Step S39. According to such a configuration, there is a possibility that the distance information indicating the distance with higher accuracy can be output.

Note that the present embodiment may have a configuration in which preview display is not performed or may have a configuration in which the ranging region selection module 33 is omitted, which is similar to the first embodiment described above.

Application Example

Hereinafter, an application example to which the ranging system 1 having the configurations as described in the first and second embodiments is applied will be described. Here, a case where the ranging system 1 is implemented as one device (ranging device) including an image capturing unit corresponding to the capture device 2 illustrated in FIGS. 1 and 29 and an image processing unit corresponding to the image processing device 3 will be described for the sake of convenience. In the following drawings, it is assumed that the ranging device 1 includes an image capturing unit 2 and an image processing unit 3.

Figure 31:
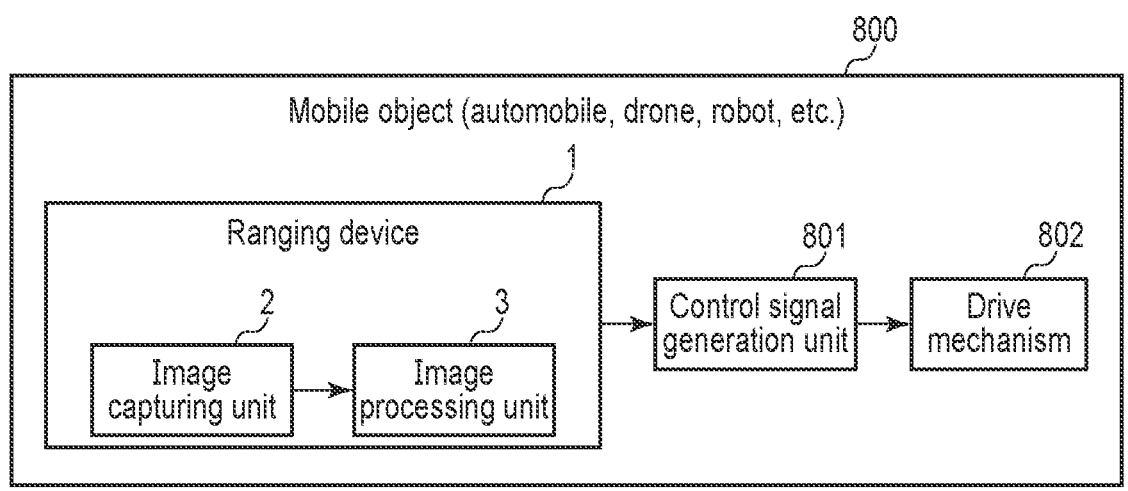
FIG. 31 is a diagram illustrating an exemplary functional configuration of a mobile object including a ranging device.

FIG. 31 illustrates an exemplary functional configuration of a mobile object 800 in which the ranging device 1 is incorporated. The mobile object 800 can be implemented as, for example, an automobile, an unmanned aerial vehicle, an autonomous mobile robot, or the like having an automatic driving function. The unmanned aerial vehicle is an airplane, a rotorcraft, a glider, or an airship that nobody can board and can fly under remote control or on autopilot. Examples thereof include a drone (multicopter), a radio-controlled airplane, a crop-dusting helicopter, and the like. Examples of the autonomous mobile robot include a mobile robot such as an automated guided vehicle (AGV), a cleaning robot for cleaning a floor, a communication robot that guides visitors variously, and the like. Examples of the mobile object 800 include not only a robot body that moves but also an industrial robot having a drive mechanism that moves or rotates a part of the robot, such as a robot arm.

As illustrated in FIG. 31, the mobile object 800 includes, for example, the ranging device 1, a control signal generation unit 801, and a drive mechanism 802. The ranging device 1 is installed such that, for example, the image capturing unit 2 can capture an image of a subject in a traveling direction of the mobile object 800 or a part thereof.

Figure 32:
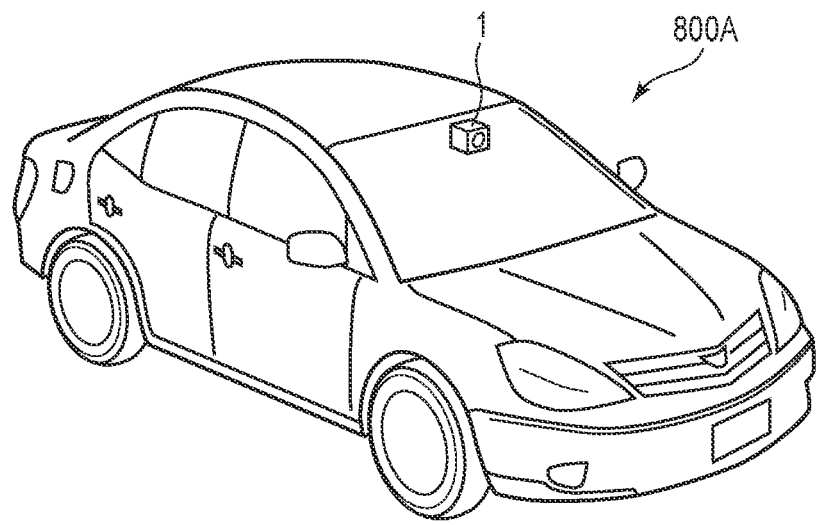
FIG. 32 is a view for describing a case where the mobile object is an automobile.

In a case where the mobile object 800 is an automobile 800A as illustrated in FIG. 32, the ranging device 1 is installed as a so-called front camera that captures an image of the front. Note that the ranging device 1 may be installed as a so-called rear camera that captures an image of the rear during backward movement. Further, a plurality of the ranging devices 1 may be installed as the front camera and the rear camera. Further, the ranging device 1 may be installed to also serve as a so-called drive recorder. That is, the ranging device 1 may be a recording device.

Figure 33:
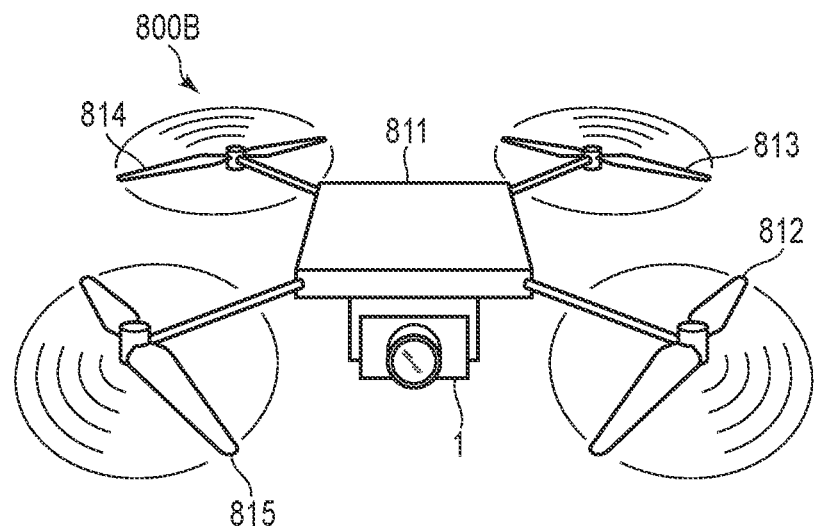
FIG. 33 is a view for describing a case where the mobile object is a drone.

FIG. 33 illustrates an example in which the mobile object 800 is a drone 800B. The drone 800B includes a drone body 811 corresponding to the drive mechanism 802 and four propeller units 812 to 815. Each of the propeller units 812 to 815 includes a propeller and a motor. When driving of the motor is transmitted to the propeller, the propeller rotates, and the drone 800B floats by the lift generated by the rotation. The ranging device 1 is mounted on, for example, a lower portion of the drone body 811.

Figure 34:
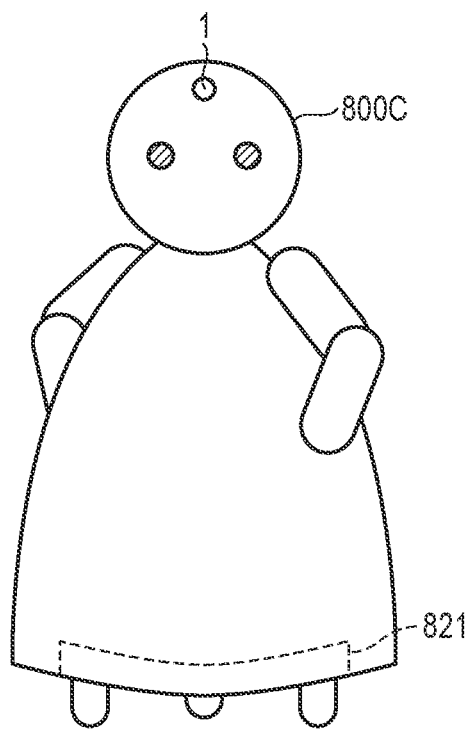
FIG. 34 is a view for describing a case where the mobile object is an autonomous mobile robot.

FIG. 34 illustrates an example in which the mobile object 800 is an autonomous mobile robot 800C. A power unit 821, which corresponds to the drive mechanism 802 and includes a motor, wheels, and the like, is provided in a lower portion of the mobile robot 800C. The power unit 821 controls a rotational speed of the motor and a direction of the wheels. The mobile robot 800C can move in an arbitrary direction as driving of the motor is transmitted to rotate the wheels installed on a road surface or a floor surface and the direction of the wheels is controlled. In the example illustrated in FIG. 34, the ranging device 1 is installed on a head of the mobile robot 800C such that, for example, the image capturing unit 2 captures an image of the front of the humanoid mobile robot 800C. Note that the ranging device 1 may be installed so as to capture images of the rear, the left, and the right of the mobile robot 800C, or a plurality of the ranging devices 1 may be installed so as to capture images of a plurality of directions. Further, it is also possible to perform dead reckoning by providing the ranging device 1 in a small robot having a small space for mounting a sensor or the like and estimating a self-position, a posture, and a position of a subject.

Figure 35:
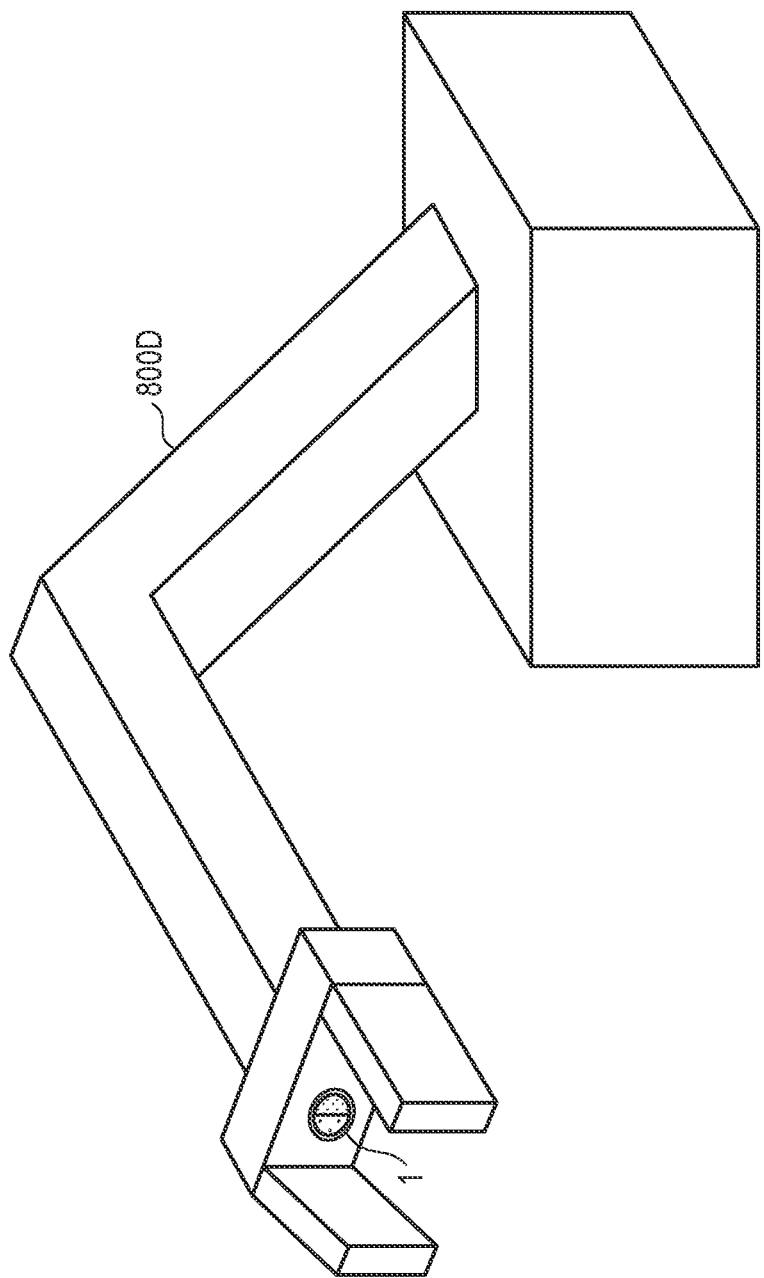
FIG. 35 is a view for describing a case where the mobile object is a robot arm.

Note that, in a case where the mobile object 800 is a robot arm 800D and movement and rotation of a part of the robot arm 800D are controlled as illustrated in FIG. 35, the ranging device 1 may be installed at a distal end or the like of the robot arm 800D. In this case, an object gripped by the robot arm 800D is captured by the image capturing unit 2 included in the ranging device 1, and the image processing unit 3 can estimate a distance to the object to be gripped by the robot arm 800D. As a result, the robot arm 800D can perform an operation of accurately gripping the object.

The control signal generation unit 801 outputs a control signal for controlling the drive mechanism 802 based on distance information indicating a distance to a subject output from the ranging device 1 (image processing unit 3). The drive mechanism 802 drives the mobile object 800 or a part of the mobile object 800 in accordance with the control signal output from the control signal generation unit 801. For example, the drive mechanism 802 performs at least one of movement, rotation, acceleration, deceleration, adjustment of thrust (lift), a change in the traveling direction, switching between a normal driving mode and an automatic driving mode (collision avoidance mode), and activation of a safety device, such as an airbag, of the mobile object 800 or a part of the mobile object 800. For example, in a case where the distance to the subject is less than a threshold, the drive mechanism 802 may perform at least one of movement, rotation, acceleration, adjustment of thrust (lift), changing a direction to a direction approaching the object, and switching from the automatic driving mode (collision avoidance mode) to the normal driving mode.

The drive mechanism 802 of the automobile 800A illustrated in FIG. 32 is, for example, a tire. The drive mechanism 802 of the drone 800B illustrated in FIG. 33 is, for example, the propeller. The drive mechanism 802 of the mobile robot 800C illustrated in FIG. 34 is, for example, a leg. The drive mechanism 802 of the robot arm 800D illustrated in FIG. 35 is, for example, a support unit that supports the distal end provided with the ranging device 1.

The mobile object 800 may further include a speaker or a display to which information (distance information) regarding the distance to the subject output from the ranging device 1 is input. The speaker or the display is connected to the ranging device 1 in a wired or wireless manner, and is configured to output a sound or an image related to the distance to the subject. Further, the mobile object 800 may include a light emitting unit to which the information regarding the distance to the subject output from the ranging device 1 is input and which can be turned on and off according to the distance to the subject, for example.

For example, in the case where the mobile object 800 is the drone 800B, the image capturing unit 2 acquires an image obtained by capturing a target, and it is determined whether the distance to the subject is equal to or more than the threshold when creation of a map (three-dimensional shape of an object), structural investigation of buildings and topographies, inspection of cracks, electric wire breakage, and the like are performed from the sky. Based on a result of the determination, the control signal generation unit 801 generates a control signal for controlling the thrust of the drone 800B such that the distance to the inspection target becomes constant. Here, it is assumed that the thrust includes lift. The drive mechanism 802 operates the drone 800B based on the control signal, so that the drone 800B can fly in parallel with the inspection target. In a case where the mobile object 800 is a monitoring drone, a control signal for controlling the thrust of the drone so as to keep a distance to a monitoring target object constant may be generated.

In a case where the mobile object 800 (for example, drone 800B) is used for maintenance and inspection of various infrastructures (hereinafter, simply referred to as the infrastructure), the image capturing unit 2 captures an image of a part in need of repair (hereinafter, referred to as a repair part) including a cracked part, a rusted part, or the like in the infrastructure, so that a distance to the repaired part can be obtained. In this case, a size of the repaired part can be calculated from the image by using the distance to the repaired part. As a result, for example, the repair part is displayed on a map representing the entire infrastructure so that a maintenance inspector of the infrastructure can recognize the repair part. Further, it is also useful to notify the maintenance inspector of the size of the repair part in advance in order to perform smooth repair work.

During flight of the drone 800B, the image capturing unit 2 acquires an image obtained by capturing a ground direction, and determines whether or not a distance to the ground is equal to or more than a threshold. The control signal generation unit 801 generates a control signal for controlling the thrust of the drone 800B such that a height from the ground becomes a designated height based on a result of the determination. The drive mechanism 802 operates the drone 800B based on the control signal, so that the drone 800B can fly at the designated height. If the drone 800B is a pesticide application drone, the pesticide can be easily evenly applied since the height of the drone 800B from the ground is kept constant in this manner.

In the case where the mobile object 800 is the automobile 800A or the drone 800B, the image capturing unit 2 captures an image of an automobile at the front or a surrounding drone, and it is determined whether or not a distance to the automobile or the drone is equal to or more than a threshold during regimental travel of the automobile 800A or cooperative flight of the drone 800B. Based on a result of the determination, the control signal generation unit 801 generates a control signal for controlling the speed of the automobile 800A or the thrust of the drone 800B so that a distance to the automobile at the front or the surrounding drone becomes constant. The drive mechanism 802 operates the automobile 800A and the drone 800B based on the control signal, so that the regimental travel of the automobile 800A or the cooperative flight of the drone 800B can be easily performed.

In the case where the mobile object 800 is the automobile 800A, it may be configured such that an instruction of a driver can be received via a user interface such that the driver of the automobile 800A can set (change) a threshold. As a result, it is possible to cause the automobile 800A to travel at an inter-vehicle distance preferred by the driver. Further, the threshold may be changed according to the speed of the automobile 800A in order to maintain a safe inter-vehicle distance from the automobile at the front. The safe inter-vehicle distance varies depending on the speed of the automobile 800A. Therefore, the threshold can be set to be larger (longer) as the speed of the automobile 800A is faster.

Further, in the case where the mobile object 800 is the automobile 800A, a predetermined distance in the traveling direction may be set as a threshold, and a control signal for operating a brake or operating a safety device, such as an airbag, may be generated when an object appears before the threshold. In this case, the safety device such as an automatic brake and an airbag is provided in the drive mechanism 802.

According to at least one embodiment described above, it is possible to provide an image processing device, a ranging device, a method, and a program capable of improving accuracy of a distance acquired from an image and environmental robustness when the distance is acquired from the image.

Further, each of the various functions described in the embodiments and modifications may be implemented by a circuit (processing circuit). Examples of the processing circuit include a programmed processor such as a central processing unit (CPU). The processor executes each of the described functions by executing a computer program (command group) stored in a memory. The processor may be a microprocessor including an electrical circuit. Examples of the processing circuit also include a digital signal processor (DSP), an application-specific integrated circuit (ASIC), a microcontroller, a controller, and other electrical circuit components. Each of the components other than the CPU described in the embodiments may also be implemented by a processing circuit.

Further, the various processes of the embodiments can be implemented by a computer program, and thus, the same effects as those of the embodiments can be easily implemented only by installing and executing the computer program in a computer through a computer-readable storage medium storing the computer program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing device comprising:
storage configured to store a statistical model generated by learning bokeh that occurs in a first image affected by aberration of an optical system and varies non-linearly in accordance with a distance to a subject in the first image;
a processor configured to:
acquire a second image affected by the aberration of the optical system;
perform color correction on the second image to reduce a number of colors expressed in the second image; and
input a third image, obtained by performing the color correction on the second image, into the statistical model and acquire first distance information indicating a distance to a subject in the third image.

2. The image processing device according to claim 1, wherein the processor is configured to perform white balance correction as the color correction.

3. The image processing device according to claim 2, wherein
the processor is configured to perform the white balance correction on the second image in a unit of a first region having a predetermined size and included in the second image, and
the first region is a region that does not affect a relationship between the aberration and the distance to the subject.

4. The image processing device according to claim 3, wherein the region that does not affect the relationship between the aberration and the distance to the subject is a region having a size including bokeh that occurs in accordance with to the distance to the subject in the second image.

5. The image processing device according to claim 3, wherein the processor is configured to calculate a first correction coefficient for a first pixel based on pixel values of a plurality of second pixels included in the first region including the first pixel, and perform the color correction on a pixel value of the first pixel using the first correction coefficient.

6. The image processing device according to claim 1, wherein
the statistical model estimates the distance to the subject in the third image and calculates a first uncertainty level for the estimated distance, and
the processor is configured to output first distance information indicating a distance at which the first uncertainty level is equal to or lower than a threshold.

7. The image processing device according to claim 3, wherein
the statistical model estimates the distance to the subject in the third image and calculates a first uncertainty level for the estimated distance, and
the processor is configured to:
perform the white balance correction on the second image in a unit of a second region different in size from the first region according to an operation of a user based on the first uncertainty level; and
input a fourth image, obtained by performing the white balance correction on the second image in the unit of the second region, into the statistical model, and acquire second distance information indicating a distance to a subject in the fourth image.

8. The image processing device according to claim 7, wherein
the statistical model estimates the distance to the subject in the fourth image and calculates a second uncertainty level for the estimated distance, and
the processor is configured to output the second distance information according to an operation of the user based on the second uncertainty level.

9. The image processing device according to claim 3, wherein
the statistical model estimates the distance to the subject in the third image and calculates a first uncertainty level for the estimated distance, and
the processor is configured to:
perform the white balance correction on the second image in a unit of a second region different in size from the first region when the first uncertainty level is not equal to or lower than a threshold, and
input a fourth image, obtained by performing the white balance correction on the second image in the unit of the second region, into the statistical model, and acquire second distance information indicating a distance to a subject in the fourth image.

10. The image processing device according to claim 9, wherein
the statistical model estimates the distance to the subject in the fourth image and calculates a second uncertainty level for the estimated distance, and
the processor is configured to output the second distance information when the second uncertainty level is equal to or lower than a threshold.

11. The image processing device according to claim 7, wherein the second region is a region obtained by changing the first region such that the first uncertainty level decreases.

12. The image processing device according to claim 1, wherein
the processor is configured to:
select a third region in the second image, and
perform the color correction on the third region.

13. The image processing device according to claim 12, wherein the processor is configured to select a region, designated by an operation of the user, as the third region.

14. The image processing device according to claim 12, wherein the processor is configured to select a region, which includes a subject detected based on a position in the second image designated by an operation of the user, as the third region.

15. A ranging device comprising:
an image capturing unit configured to capture an image;
storage configured to store a statistical model generated by learning bokeh that occurs in a first image affected by aberration of an optical system and varies non-linearly in accordance with a distance to a subject in the first image; and a processor configured to:
  acquire a second image affected by the aberration of the optical system of the image capturing unit;
  perform color correction on the second image to reduce a number of colors expressed in the second image; and
  input a third image, obtained by performing the color correction on the second image, into the statistical model and acquire distance information indicating a distance to a subject in the third image.

16. A method executed by an image processing device comprising storage configured to store a statistical model generated by learning bokeh that occurs in a first image affected by aberration of an optical system and varies non-linearly in accordance with a distance to a subject in the first image, the method comprising:
  acquiring a second image affected by the aberration of the optical system;
  performing color correction on the second image to reduce a number of colors expressed in the second image; and
  inputting a third image, obtained by performing the color correction on the second image, into the statistical model and acquiring distance information indicating a distance to a subject in the third image.

* * * * *